US012572580B2

(12) United States Patent
Akimoto et al.

(10) Patent No.: US 12,572,580 B2
(45) Date of Patent: Mar. 10, 2026

(54) INFORMATION PROCESSING DEVICE, INFORMATION PROCESSING METHOD, AND PROGRAM

(71) Applicant: NEC Corporation, Tokyo (JP)

(72) Inventors: Kosuke Akimoto, Tokyo (JP); Kazeto Yamamoto, Tokyo (JP); Kunihiko Sadamasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 18/269,180

(22) PCT Filed: Dec. 28, 2020

(86) PCT No.: PCT/JP2020/049128
§ 371 (c)(1),
(2) Date: Jun. 22, 2023

(87) PCT Pub. No.: WO2022/144968
PCT Pub. Date: Jul. 7, 2022

(65) Prior Publication Data
US 2024/0045895 A1    Feb. 8, 2024

(51) Int. Cl.
G06F 16/353    (2025.01)
G06F 16/334    (2025.01)
(Continued)

(52) U.S. Cl.
CPC ........ G06F 16/353 (2019.01); G06F 16/3347 (2019.01); G06F 40/12 (2020.01); G06F 40/289 (2020.01); G06N 3/044 (2023.01)

(58) Field of Classification Search
CPC .... G06F 16/353; G06F 16/3347; G06F 40/22; G06F 40/295; G06F 40/30;
(Continued)

(56) References Cited

U.S. PATENT DOCUMENTS 10,255,273 B2 *    4/2019  Chakraborty ....... G06F 16/3344
10,565,443 B2 *    2/2020  Hosabettu .......... G06V 30/414
(Continued)

FOREIGN PATENT DOCUMENTS

JP        2011-227688 A    11/2011
JP        2012-027845 A    2/2012
(Continued)

OTHER PUBLICATIONS

JP Office Communication for JP Application No. 2022-572828, mailed on Jun. 25, 2024 with English Translation.
(Continued)

*Primary Examiner* — Abdelali Serrou
(74) *Attorney, Agent, or Firm* — Sughrue Mion, PLLC

(57)    ABSTRACT

In order to more accurately categorize a relation between a plurality of entities, an information processing apparatus (1) includes a relation vector generation section (11), a feature vector generation section (12), and a relation categorization section (13). The relation vector generation section (11) generates a relation vector representing a relation between a plurality of entities of interest from at least one sentence which has been selected from a sentence set and in which the plurality of entities of interest occur. The feature vector generation section (12) generates, for each entity of interest, a feature vector representing a feature of that entity of interest from at least one sentence which has been selected from the sentence set and in which that entity of interest occurs. The relation categorization section (13) categorizes a relation between the plurality of entities of interest with use of a relation vector and feature vectors.

8 Claims, 9 Drawing Sheets

(51) Int. Cl.

| | |
|---|---|
| *G06F 40/12* | (2020.01) |
| *G06F 40/289* | (2020.01) |
| *G06N 3/044* | (2023.01) |

(58) Field of Classification Search

CPC .. G06F 16/3344; G06F 16/3346; G06F 40/12; G06F 40/216; G06F 40/289; G06F 16/35; G06F 40/284; G06F 18/22; G06F 40/211; G06F 40/279; G06F 16/355; G06F 16/367; G06F 18/214; G06F 40/242; G06F 40/247; G06F 16/285; G06F 16/335; G06F 18/211; G06F 18/23; G06F 21/6245; G06F 40/166; G06F 16/215; G06F 16/2237; G06F 16/2433; G06F 16/245; G06F 16/2457; G06F 16/256; G06F 16/284; G06F 16/31; G06F 16/3329; G06F 16/338; G06F 16/345; G06F 16/36; G06F 16/374; G06F 16/58; G06F 16/683; G06F 16/9024; G06F 16/951; G06F 16/9538; G06F 18/23213; G06F 18/2413; G06F 40/16; G06F 40/194; G06F 40/237; G06F 40/58; G06F 9/30192; G10L 15/1815; G10L 15/22; G10L 15/26; G10L 2015/223

See application file for complete search history.

(56) References Cited

U.S. PATENT DOCUMENTS

| | | | | |
|---|---|---|---|---|
| 10,699,069 | B2 * | 6/2020 | Gliozzo | G06F 40/18 |
| 10,867,256 | B2 * | 12/2020 | Bugay | G06F 40/169 |
| 11,216,614 | B2 * | 1/2022 | Kar | G06F 40/205 |
| 11,714,787 | B2 * | 8/2023 | Zhang | G06F 40/295 |
| | | | | 707/803 |
| 2012/0029908 | A1 | 2/2012 | Takamatsu | |
| 2015/0052098 | A1 | 2/2015 | Kveton et al. | |
| 2016/0147780 | A1 * | 5/2016 | Zhiyanov | G06F 16/5838 |
| | | | | 707/706 |
| 2017/0212899 | A1 * | 7/2017 | Lightner | G06F 16/22 |
| 2017/0351749 | A1 * | 12/2017 | Quirk | G06F 40/295 |
| 2018/0025008 | A1 * | 1/2018 | Tan | G06F 16/3331 |
| | | | | 707/737 |
| 2018/0144252 | A1 | 5/2018 | Minervini et al. | |
| 2019/0155898 | A1 * | 5/2019 | Li | G06F 40/211 |
| 2021/0334309 | A1 | 10/2021 | Tsutsumi et al. | |
| 2021/0342539 | A1 | 11/2021 | Zhang | |
| 2021/0391080 | A1 * | 12/2021 | Fan | G06F 40/30 |
| 2022/0164683 | A1 * | 5/2022 | Hao | G06F 16/35 |
| 2022/0222442 | A1 | 7/2022 | Akimoto et al. | |
| 2022/0245183 | A1 | 8/2022 | Akimoto et al. | |

FOREIGN PATENT DOCUMENTS

| | | | |
|---|---|---|---|
| JP | 2012-243125 | A | 12/2012 |
| JP | 2018-085116 | A | 5/2018 |
| JP | 2018-206263 | A | 12/2018 |
| JP | 2019-008368 | A | 1/2019 |
| JP | 2020-113129 | A | 7/2020 |
| JP | 2020-527762 | A | 9/2020 |
| JP | 2022-527060 | A | 5/2022 |
| WO | 2019/082362 | A | 5/2019 |
| WO | 2019/224891 | A1 | 11/2019 |
| WO | 2020/240870 | A1 | 12/2020 |
| WO | 2020/240871 | A1 | 12/2020 |

OTHER PUBLICATIONS

International Search Report for PCT Application No. PCT/JP2020/049128, mailed on Mar. 30, 2021.

English translation of Written opinion for PCT Application No. PCT/JP2020/049128, mailed on Mar. 30, 2021.

ChenhanYuan et al., "Clustering-based Unsupervised Generative Relation Extraction", arXiv preprint arXiv: 2009, 12681 (2020).

* cited by examiner

FIG. 6

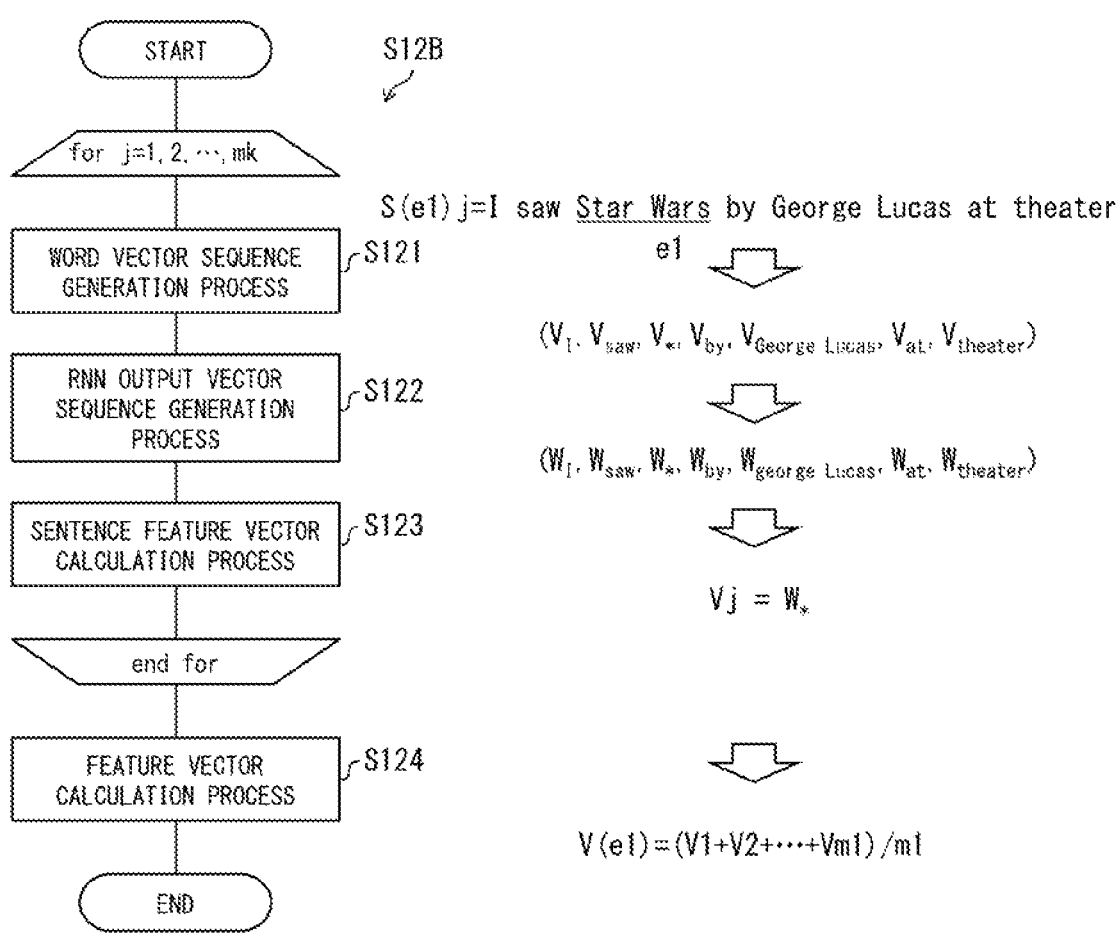

S12B

START for j=1, 2, ⋯, mk

WORD VECTOR SEQUENCE GENERATION PROCESS ⌐S121

RNN OUTPUT VECTOR SEQUENCE GENERATION PROCESS ⌐S122

SENTENCE FEATURE VECTOR CALCULATION PROCESS ⌐S123 end for

FEATURE VECTOR CALCULATION PROCESS ⌐S124

END

S(e1)j=I saw Star Wars by George Lucas at theater.

e1

$(V_I, V_{saw}, V_*, V_{by}, V_{George\ Lucas}, V_{at}, V_{theater})$ $(W_I, W_{saw}, W_*, W_{by}, W_{george\ Lucas}, W_{at}, W_{theater})$ $Vj = W_*$ $V(e1) = (V1+V2+⋯+Vm1)/m1$

INFORMATION PROCESSING DEVICE, INFORMATION PROCESSING METHOD, AND PROGRAM

This application is a National Stage Entry of PCT/JP2020/049128 filed on Dec. 28, 2020, the contents of all of which are incorporated herein by reference, in their entirety.

TECHNICAL FIELD

The present invention relates to a technique for categorizing a relation between a plurality of entities.

BACKGROUND ART

A technique for categorizing a relation between a plurality of entities is known. For example, Non-Patent Literature 1 discloses a related technique for categorizing a relation between a pair of entities based on similarity of sentence expressions describing relations between the pair of entities. This related technique discriminates, in a sentence in which a certain pair of entities occurs, sentence expressions describing relations between the certain pair with use of a syntactic structure of sentence. Moreover, the related technique determines whether or not a relation between one pair is identical with a relation between another pair depending on whether or not discriminated sentence expressions are similar to each other.

CITATION LIST

Non-Patent Literature

Non-Patent Literature 1

Yuan, Chenhan, et al. "Clustering-based Unsupervised Generative Relation Extraction." arXiv preprint arXiv: 2009.12681 (2020).

SUMMARY OF INVENTION

Technical Problem

In the related technique disclosed in Non-Patent Literature 1, there is room for improvement in accuracy of categorizing a relation between a plurality of entities. The reason for this is as follows.

Here, a relation between a plurality of entities may be determined in accordance with features of the respective entities. For example, a relation "X is a leader of Y" for entities X and Y holds true when X is a person rather than an animal. However, the related technique categorizes a relation of a pair based on similarity of sentence expressions which have been discriminated using a syntactic structure of sentence. Therefore, there are cases in which a relation in accordance with features of respective entities cannot be categorized.

An example aspect of the present invention is accomplished in view of the above problem, and its example object is to provide a technique for more accurately categorizing a relation between a plurality of entities.

Solution to Problem

An information processing apparatus according to an example aspect of the present invention at least one processor, the at least one processor carrying out: a relation vector generation process of generating a relation vector that represents a relation between a plurality of entities of interest from at least one relation vector generation sentence which has been selected from a sentence set and in which the plurality of entities of interest occur; a feature vector generation process of generating, for each of the plurality of entities of interest, a feature vector that represents a feature of that entity of interest from at least one feature vector generation sentence which has been selected from the sentence set and in which that entity of interest occurs; and a relation categorization process of categorizing a relation between the plurality of entities of interest with use of a relation vector which has been generated in the relation vector generation process and feature vectors which have been generated in the feature vector generation process.

An information processing method according to an example aspect of the present invention includes: generating a relation vector that represents a relation between a plurality of entities of interest from at least one relation vector generation sentence which has been selected from a sentence set and in which the plurality of entities of interest occur; generating, for each of the plurality of entities of interest, a feature vector that represents a feature of that entity of interest from at least one feature vector generation sentence which has been selected from the sentence set and in which that entity of interest occurs; and categorizing a relation between the plurality of entities of interest with use of the relation vector and the feature vectors which have been respectively generated for the plurality of entities of interest.

A non-transitory storage medium according to an example aspect of the present invention is a non-transitory storage medium storing a program for causing a computer to function as the foregoing information processing apparatus, the program causing the computer to carry out the relation vector generation process, the feature vector generation process, and the relation categorization process.

An information processing apparatus according to an example aspect of the present invention at least one processor, the at least one processor carrying out: a relation vector generation process of generating a relation vector with use of an algorithm including a plurality of parameters from at least one relation vector generation sentence which has been selected from a sentence set and in which a plurality of entities of interest occur, the relation vector representing a relation between the plurality of entities of interest; a relation vector generation parameter updating process of updating the plurality of parameters such that a degree of similarity increases between a plurality of relation vectors that are generated in the relation vector generation process from a plurality of sentences in all of which the plurality of entities of interest occur; and a relation categorization process of categorizing a relation between the plurality of entities of interest with use of a relation vector which has been generated in the relation vector generation process.

Advantageous Effects of Invention

According to an example aspect of the present invention, it is possible to more accurately categorize a relation between a plurality of entities.

BRIEF DESCRIPTION OF DRAWINGS

FIG. 6 is a flowchart illustrating a flow of an information processing method according to the third example embodiment of the present invention.

EXAMPLE EMBODIMENTS

Term Definitions

Figure 1:
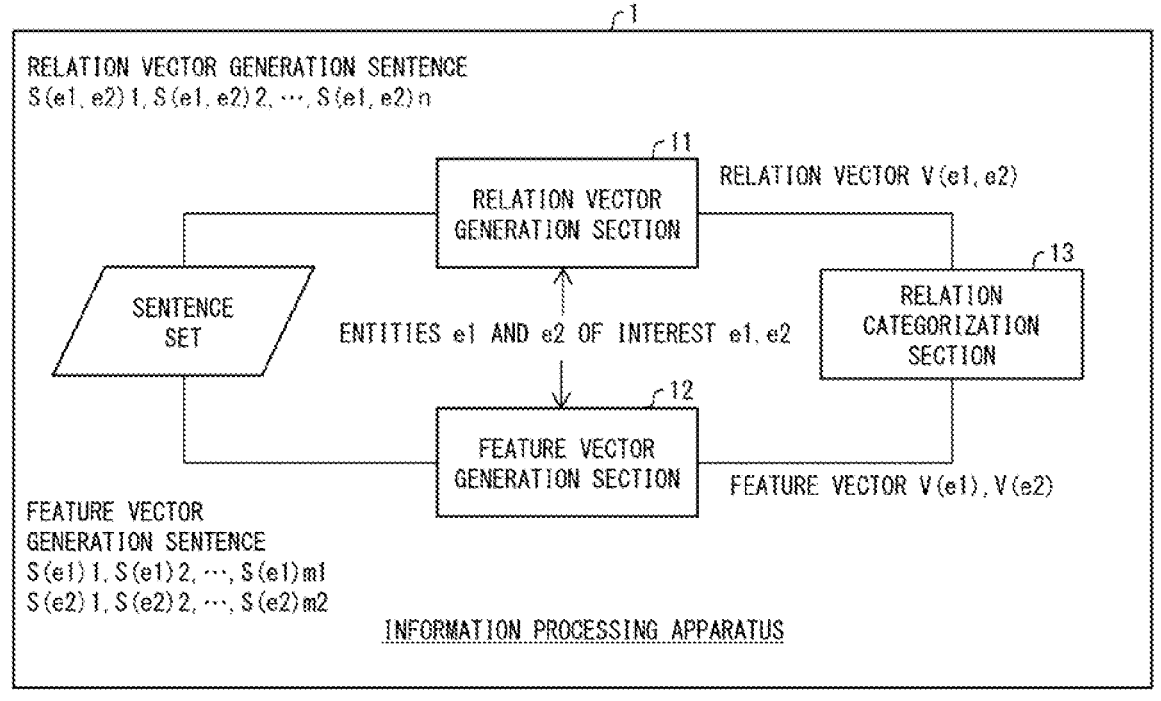
FIG. 1 is a block diagram illustrating a configuration of an information processing apparatus according to a first example embodiment of the present invention.

Before describing each of example embodiments of the present invention, terms used in each of the example embodiments will be described. Note that an information processing apparatus according to each of the example embodiments is an apparatus for categorizing a relation between a plurality of entities of interest with reference to a sentence set in which the plurality of entities of interest occur.

(Entity)

Entities are elements constituting an event that is expressed by a sentence. Each entity is distinguished from other entities by its name. An entity can be a tangible object or can be an intangible object. An entity can be a subject or an object expressed by a noun, can be an action or a relation expressed by a verb, or can be a state or a degree expressed by an adjective or adjectival verb. There are types of entities. For example, a type of an entity whose name is "Japan" is "Country". A type of an entity whose name is "Shinzo Abe" is "Person". A type of an entity whose name is "Blue" is "Color". Hereinafter, when it is necessary to separately describe entities, descriptions will be made with reference signs e1, e2, and so forth.

(Plurality of Entities of Interest)

A plurality of entities of interest are a plurality of entities of interest among entities which occur in a sentence set. In the present example embodiment, it is assumed that the number of entities of interest is two. Note, however, that the number of entities of interest is not limited to two, and may be three or more.

(Sentence Set)

A sentence set is a set of sentences. A sentence set includes a sentence in which at least one of or all of a plurality of entities of interest occur. A sentence consists of one or more words.

(Occurrence)

A case in which an entity occurs in a sentence means that the entity is referred to in that sentence. Moreover, a case in which an entity is referred to in a sentence means that one or more words constituting the sentence represent that entity. In other words, a sentence in which an entity occurs includes a word representing that entity. Note that a word representing a certain entity is not limited to one. For example, one example of a word representing an entity "Shinzo Abe" can be a plurality of words "Former Prime Minister Abe", "Abe Shinzo", and the like. A word indicating an entity can also be considered as a type of word representing that entity. For example, a pronoun "he" indicating an entity "Shinzo Abe" can also be regarded as a word representing the entity "Shinzo Abe". For example, in a case where a sentence includes words "Former Prime Minister Abe", another sentence includes words "Abe Shinzo", and still another sentence includes a word "he" indicating "Shinzo Abe", the entity "Shinzo Abe" occurs in all of these sentences.

(Relation)

In an event that is represented by a sentence, a plurality of entities may have relevance. For example, entities X "Japan" and Y "Shinzo Abe" have a relationship in which "X was a leader of Y". Such a relationship between entities is referred to as a relation.

First Example Embodiment

The following description will discuss a first example embodiment of the present invention in detail with reference to the drawings. The present example embodiment is a basic form of example embodiments described later.

<Configuration of Information Processing Apparatus>

The following description will discuss an information processing apparatus 1 according to the first example embodiment of the present invention with reference to FIG. 1. FIG. 1 is a block diagram illustrating the configuration of the information processing apparatus 1.

The information processing apparatus 1 includes a relation vector generation section 11, a feature vector generation section 12, and a relation categorization section 13. The relation vector generation section 11 is an example configuration for realizing the "relation vector generation means" recited in claims. The relation categorization section 13 is an example configuration for realizing the "relation categorization means" recited in claims. An example configuration for realizing the "relation categorization means" recited in claims.

(Relation Vector Generation Section)

The relation vector generation section 11 generates a relation vector representing a relation between a plurality of entities of interest from at least one relation vector generation sentence which has been selected from a sentence set.

For example, the relation vector generation section 11 generates a relation vector as follows. Specifically, (1) first, the relation vector generation section 11 converts a relation vector generation sentence into a word sequence or into a graph in which words serve as nodes. The relation vector generation section 11 may use, when carrying out this conversion, information obtained by parsing the relation vector generation sentence. (2) Next, the relation vector generation section 11 converts each of words included in the word sequence or the graph which has been generated in (1) into a vector as a word vector. For example, the relation vector generation section 11 uses a one-hot-vector as a word vector corresponding to a word. In this one-hot-vector, elements of each vector correspond to different types of words, respectively, and only an element corresponding to each word is 1, and other elements are 0. (3) Next, the relation vector generation section 11 calculates a relation vector with use of the word vectors of the respective words which have been generated in (2). For example, the relation vector generation section 11 calculates a relation vector by inputting word vectors of respective words into a calculation model in which a process that reflects a structure of a word sequence or a graph is carried out. Examples of such a calculation model include, but not limited to, a recurrent neural network, a graph neural network, Transformer, and the like.

Note that, as a technique for the relation vector generation section 11 to generate a relation vector, it is possible to employ, for example, a technique disclosed in Non-Patent Literature 1 above, Reference Literature 1 below, or Reference Literature 2 below.

[Reference Literature 1] Zeng, Daojian, et al. "Distant supervision for relation extraction via piecewise convolutional neural networks." Proceedings of the 2015 conference on empirical methods in natural language processing. 2015

[Reference Literature 2] Miwa, Makoto, and Mohit Bansal. "End-to-End Relation Extraction using LSTMs on Sequences and Tree Structures." Proceedings of the 54th Annual Meeting of the Association for Computational Linguistics (Volume 1: Long Papers). 2016.

In each of the techniques disclosed in Non-Patent Literature 1, Reference Literature 1 below, and Reference Literature 2 below, a relation between entities is classified with use of a classification model. The relation vector generation section 11 may use any of these techniques and use, as a relation vector, a vector which is input into a classification model.

(Relation Vector Generation Sentence)

A relation vector generation sentence is a sentence which has been selected from a sentence set and in which a plurality of entities of interest occur. In a case where entities e1 and e2 are entities of interest among entities which occur in a sentence set, the sentence set includes n relation vector generation sentences in which the entities e1 and e2 of interest occur. Hereinafter, a reference sign S(e1,e2)i is given to each of the n relation vector generation sentences. Note that n is an integer of 1 or more, and i is an integer of 1 or more and n or less.

(Feature Vector Generation Section)

The feature vector generation section 12 generates, for each of a plurality of entities of interest, a feature vector representing a feature of that entity of interest from at least one feature vector generation sentence in which that entity of interest occurs. The feature vector represents, for example, a type of entity of interest which is inferred from a sentence in which that entity of interest occurs.

For example, the feature vector generation section 12 generates a feature vector as follows. Specifically, (1) first, the feature vector generation section 12 converts a feature vector generation sentence into a word sequence or into a graph in which words serve as nodes. The feature vector generation section 12 may use, when carrying out this conversion, information obtained by parsing the feature vector generation sentence. (2) Next, the feature vector generation section 12 converts each of words included in the word sequence or the graph which has been generated in (1) into a vector as a word vector. For example, the feature vector generation section 12 uses a one-hot-vector as a word vector corresponding to a word. In this one-hot-vector, elements of each vector correspond to different types of words, respectively, and only an element corresponding to each word is 1, and other elements are 0. (3) Next, the feature vector generation section 12 calculates a feature vector with use of the word vectors of the respective words which have been generated in (2). For example, the feature vector generation section 12 calculates a feature vector by inputting word vectors of respective words into a calculation model in which a process that reflects a structure of a word sequence or a graph is carried out. Examples of such a calculation model include, but not limited to, a recurrent neural network, a graph neural network, Transformer, and the like. As a technique for generating a feature vector from a feature vector generation sentence, for example, Word2Vec, a known technique disclosed in Reference Literature 3 below, or the like can be applied.

[Reference Literature 3] Liang, Chen, et al. "Bond: Bert-assisted open-domain named entity recognition with distant supervision." Proceedings of the 26th ACM SIGKDD International Conference on Knowledge Discovery &, Data Mining. 2020.

In the technique disclosed in Reference Literature 3, a type of entity is classified with use of a classification model. The feature vector generation section 12 may use this technique and use, as a feature vector, a vector which is input into a classification model.

(Feature Vector Generation Sentence)

A feature vector generation sentence is a sentence which has been selected from a sentence set and in which one of a plurality of entities of interest occurs. In a case where entities e1 and e2 are entities of interest among entities which occur in a sentence set, the sentence set includes m1 feature vector generation sentences in which the entity e1 of interest occurs. Moreover, the sentence set includes m2 feature vector generation sentences in which the entity e2 of interest occurs. Hereinafter, a reference sign S(ek)j is given to each of mk (k=1 or 2) feature vector generation sentences. Note that mk is an integer of 1 or more, and j is an integer of 1 or more and mk or less.

(Relation Categorization Section)

The relation categorization section 13 categorizes a relation between a plurality of entities of interest with use of a relation vector which has been generated by the relation vector generation section 11 and feature vectors which have been generated by the feature vector generation section 12.

<Flow of Information Processing Method>

Figure 2:
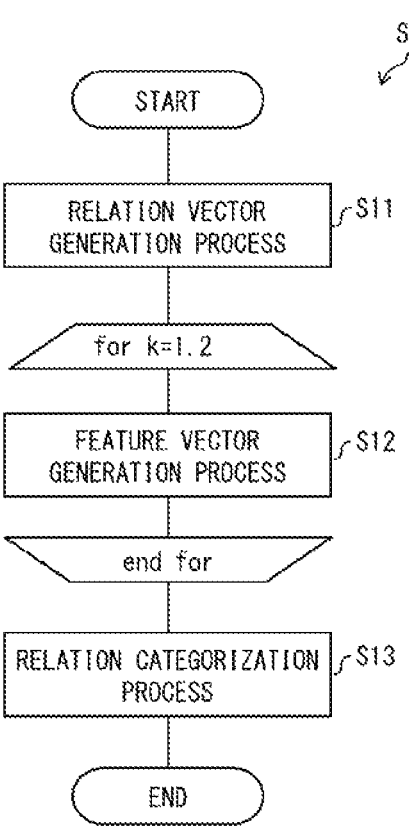
FIG. 2 is a flowchart illustrating a flow of an information processing method according to the first example embodiment of the present invention.

The following description will discuss a flow of an information processing method S1 that is carried out by the information processing apparatus 1, with reference to FIG. 2. FIG. 2 is a flowchart illustrating the flow of the information processing method S1. As illustrated in FIG. 2, the information processing method S1 includes steps S11 through S13. Hereinafter, it is assumed that entities e1 and e2 are entities of interest among entities which occur in a sentence set.

(Step S11)

In step S11, the relation vector generation section 11 generates a relation vector V(e1,e2) that represents a relation between the entities e1 and e2 of interest from at least one relation vector generation sentence S(e1,e2) which has been selected from a sentence set.

(Step S12)

The feature vector generation section 12 carries out step S12 for each k (=1 or 2). In step S12, the feature vector generation section 12 generates a feature vector V(ek) that represents a feature of an entity ek of interest from at least one feature vector generation sentence S(ek) which has been selected from the sentence set.

(Step S13)

In step S13, the relation categorization section 13 categorizes the relation between the entities e1 and e2 of interest with use of the relation vector V(e1,e2) which has been generated in step S11 and the feature vectors V(e1) and V(e2) which have been generated in step S12. For example, the relation categorization section 13 generates one vector based on the relation vector V(e1,e2), the feature vector V(e1), and the feature vector V(e2), and categorizes the relation between the entities e1 and e2 of interest based on similarity between generated vectors. For example, the relation categorization section 13 may categorize the relation by generating a cluster of the generated vectors. Examples of a method for generating the one vector include, but not limited to, a method in which the relation vector V(e1,e2), the feature vector V(e1), and the feature vector V(e2) are concatenated. For example, it is assumed that a vector in which a relation vector V(e1,e2), a feature vector V(e1), and a feature vector V(e2) are concatenated is similar to a vector in which a relation vector V(e3,e4), a feature vector V(e3), and a feature vector V(e4) are concatenated. In this case, the relation categorization section 13 determines that the "entities e1 and e2 of interest" have the same relation as the "entities e3 and e4 of interest". Note that the relation categorization section 13 may determine whether or not vectors are similar to each other based, for example, on whether or not an inner product of vectors or cosine similarity exceeds a threshold.

Effect of the Present Example Embodiment

As described above, in the present example embodiment, a relation between a plurality of entities of interest is categorized with use of a relation vector that has been generated from a relation vector generation sentence in which the plurality of entities of interest occur, and feature vectors that have been generated from feature vector generation sentences in which the entities of interest occur. As a result, features of a respective plurality of entities of interest are considered in addition to a relation between the plurality of entities of interest. Therefore, it is possible to more accurately categorize a relation between a plurality of entities of interest.

Second Example Embodiment

The following description will discuss a second example embodiment of the present invention in detail with reference to the drawings. The same reference numerals are given to constituent elements which have functions identical with those described in the first example embodiment, and descriptions as to such constituent elements are omitted as appropriate.

An information processing apparatus 1A according to the present example embodiment carries out, with modification, step S11 (relation vector generation process) included in the information processing method S1 according to the first example embodiment. In other words, the information processing apparatus 1A is an example aspect obtained by altering the information processing apparatus 1 according to the first example embodiment so as to suitably carry out modified step S11.

<Configuration of Information Processing Apparatus>

Figure 3:
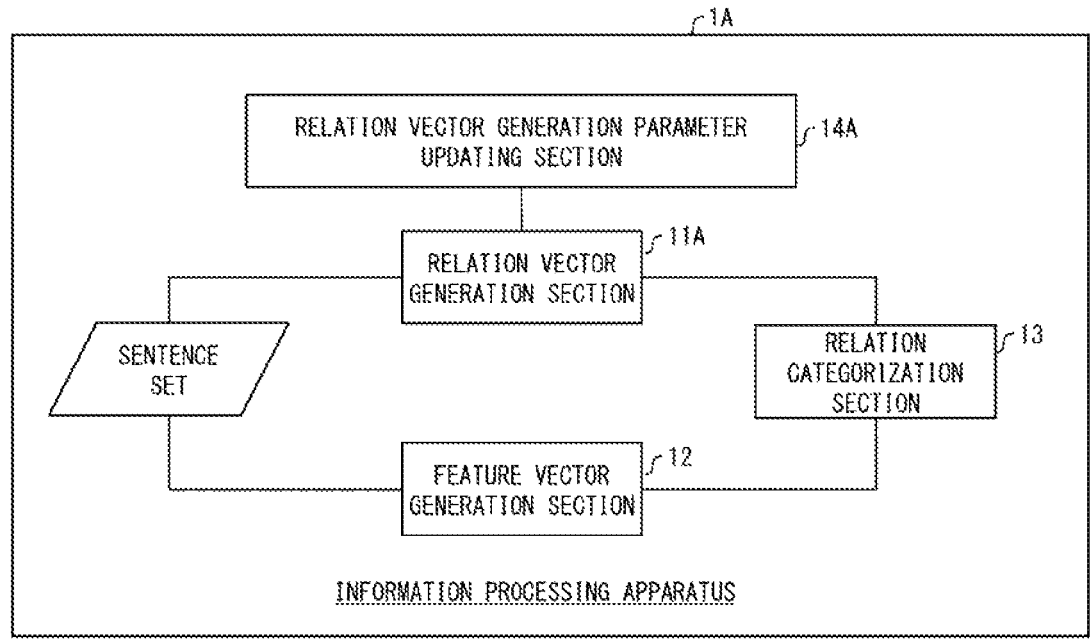
FIG. 3 is a block diagram illustrating a configuration of an information processing apparatus according to a second example embodiment of the present invention.

The following description will discuss a configuration of the information processing apparatus 1A, with reference to FIG. 3. FIG. 3 is a block diagram illustrating the configuration of the information processing apparatus 1A. As illustrated in FIG. 3, the information processing apparatus 1A is different from the information processing apparatus 1 according to the first example embodiment in that the information processing apparatus 1A includes a relation vector generation section 11A instead of the relation vector generation section 11, and further includes a relation vector generation parameter updating section 14A. The other configurations are similar to those of the information processing apparatus 1, and therefore detailed descriptions of such configurations will not be repeated.

(Relation Vector Generation Section)

The relation vector generation section 11A generates a relation vector from at least one relation vector generation sentence with use of an algorithm that includes a plurality of parameters. The relation vector generation section 11A is an example configuration for realizing the "relation vector generation means" recited in claims.

(Specific Example of Algorithm)

A specific example of an algorithm that includes a plurality of parameters can be a recurrent neural network. The recurrent neural network is a neural network in which a word vector sequence is used as input, and vectors corresponding to respective word vectors constituting the word vector sequence are used as output. The recurrent neural network that is used by the relation vector generation section 11A is hereinafter referred to also as a first RNN. A plurality of parameters included in the first RNN are updated by the relation vector generation parameter updating section 14A.

(Relation Vector Generation Parameter Updating Section)

The relation vector generation parameter updating section 14A updates the plurality of parameters described above such that a degree of similarity between a plurality of relation vectors increases. The plurality of relation vectors are generated by the relation vector generation section 11A from a plurality of sentences in all of which a plurality of entities of interest occur. Details of an updating process of updating a plurality of parameters and a specific example thereof will be described later. The relation vector generation parameter updating section 14A is an example configuration for realizing the "relation vector generation parameter updating means" recited in claims.

<Flow of Information Processing Method>

Figure 4:
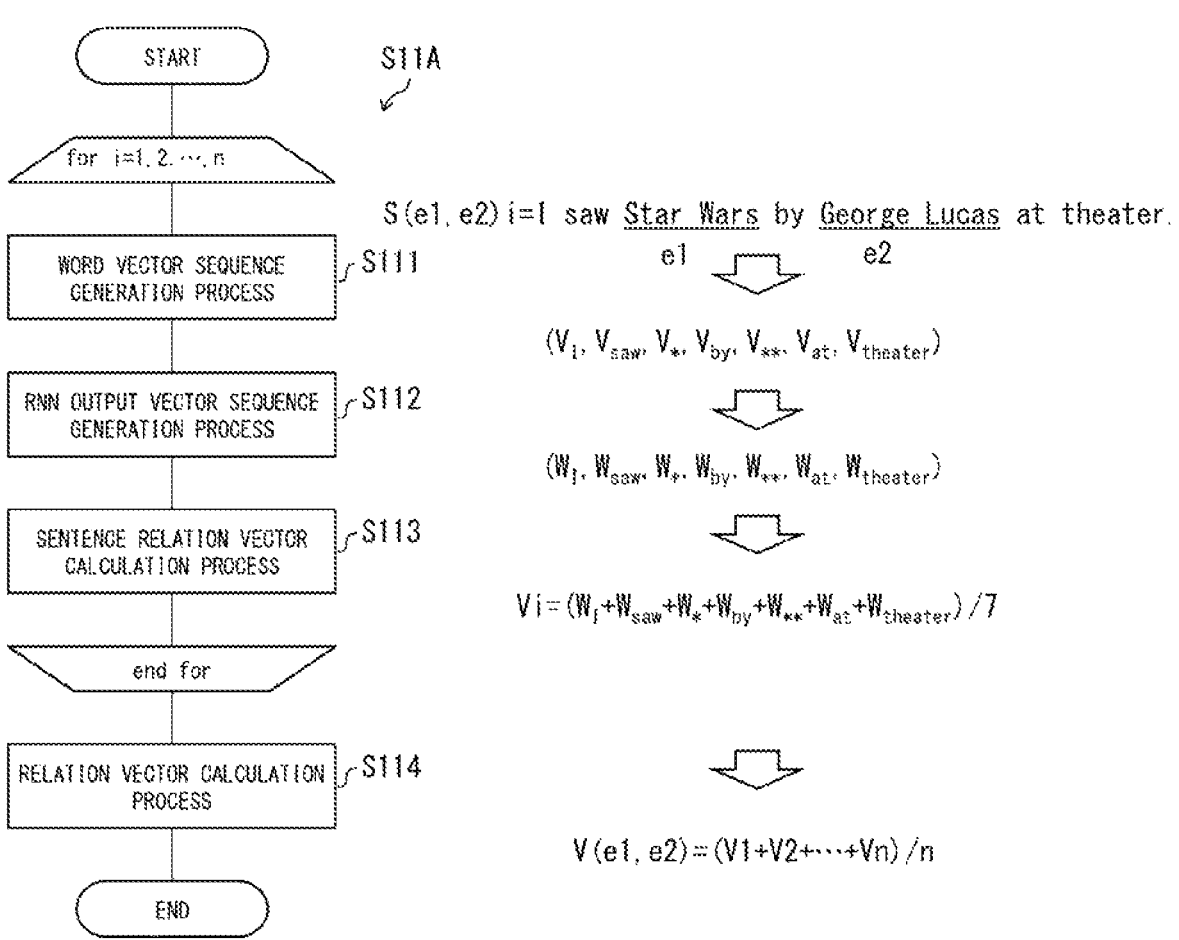
FIG. 4 is a flowchart illustrating a flow of an information processing method according to the second example embodiment of the present invention.

The following description will discuss a flow of an information processing method that is carried out by the information processing apparatus 1A, with reference to FIG. 4. The information processing apparatus 1A carries out, with modification, step S11 of the information processing method S1 described above with reference to FIG. 2. FIG. 4 is a flowchart illustrating a detailed flow of a relation vector generation process S11A, which is a variation of step S11. (Flow of Relation Vector Generation Process)

As illustrated in FIG. 4, the relation vector generation process S11A includes steps S111 through S114. The relation vector generation section 11A carries out steps S111 through S113 for each of n relation vector generation sentences S(e1,e2)i.

(Step S111)

In step S111, the relation vector generation section 11A generates a word vector sequence for the relation vector generation sentence S(e1,e2)i. Specifically, the relation vector generation section 11A replaces a word representing each of entities e1 and e2 of interest with a predetermined word vector. Moreover, the relation vector generation section 11A replaces a word representing an entity other than the plurality of entities e1 and e2 of interest with a word vector representing that word. Thus, the relation vector generation section 11A generates a word vector sequence corresponding to the relation vector generation sentence S(e1,e2)i. The process of this step is an example of the "first word vector sequence generation process" recited in claims.

(Specific Example of Step S111)

The following description will discuss a specific example in which, for example, the relation vector generation sentence S(e1,e2)i is "I saw Star Wars by George Lucas at theater.", words representing the entity e1 of interest are "Star Wars", and words representing the entity e2 of interest are "George Lucas". The relation vector generation section 11A generates a word vector sequence (VI,Vsaw,V*,Vby, V**,Vat,Vtheater). Here, "VI" is a word vector representing the word "I". "Vsaw" is a word vector representing the word "saw". "Vby" is a word vector representing the word "by". "Vat" is a word vector representing the word "at". "Vtheater" is a word vector representing the word "theater". "V*" and "V**" are predetermined word vectors, respectively.

(Step S112)

In step S112, the relation vector generation section 11A inputs, into the first RNN, the word vector sequence which has been generated in step S111. Thus, the relation vector generation section 11A generates an RNN output vector sequence that corresponds to the relation vector generation sentence S(e1,e2)i. The first RNN is as described above. A plurality of parameters included in the first RNN have been updated by the relation vector generation parameter updating section 14A. The process of this step is an example of the "first RNN output vector sequence generation process" recited in claims.

(Specific Example of Step S112)

The following description will discuss a specific example of step S112 which is carried out in response to the specific example of step S111. The relation vector generation section 11A generates an RNN output vector sequence (WI,Wsaw, W*,Wby,W**,Wat,Wtheater) by inputting, into the first RNN, the word vector sequence (VI,Vsaw,V*,Vby,V**,Vat, Vtheater). Here, "WI" is a vector which is output in response to input of the word vector "VI". "Wsaw" is a vector which is output in response to input of the word vector "Vsaw". "Wby" is a vector which is output in response to input of the word vector "Vby". "Wat" is a vector which is output in response to input of the word vector "Vat". "Wtheater" is a vector which is output in response to input of the word vector "Vtheater". "W*" is a vector which is output in response to input of the word vector "V*". "W" is a vector which is output in response to input of the word vector "V".

(Step S113)

In step S113, the relation vector generation section 11A averages, for each element, the vectors constituting the RNN output vector sequence which has been generated in step S112. Thus, the relation vector generation section 11A calculates a sentence relation vector Vi corresponding to the relation vector generation sentence. The process of this step is an example of the "sentence relation vector calculation process" recited in claims.

In the present example embodiment, an example is described in which one sentence relation vector Vi is generated from one relation vector generation sentence S(e1, e2)i. Note, however, that one sentence relation vector Vi may be generated from a plurality of relation vector generation sentences S(e1,e2)i1, S(e1,e2)i2, and so forth.

(Specific Example of Step S113)

The following description will discuss a specific example of step S113 which is carried out in response to the specific examples of steps S111 and S112. The relation vector generation section 11A divides a sum of the seven vectors WI, Wsaw, W*, Wby, W**, Wat, and Wtheater constituting the RNN output vector sequence by 7, which is the number of vectors, and thus calculates a sentence relation vector Vi.

When the processes of steps S111 through S113 have been completed for each of the n relation vector generation sentences S(e1,e2)i, the relation vector generation section 11A carries out a process of the next step S114.

(Step S114)

In step S114, the relation vector generation section 11A averages, for each element, the sentence relation vectors Vi which correspond to the respective n relation vector generation sentences S(e1,e2)i and which have been calculated in step S113. Thus, the relation vector generation section 11A calculates a relation vector V(e1,e2). In other words, the relation vector V(e1,e2) is calculated by dividing a sum of n sentence relation vectors Vi by n. The process of this step is an example of the "relation vector calculation process" recited in claims.

(Specific Example of Parameter Updating Process)

The following description will discuss a specific example of an updating process in which the relation vector generation parameter updating section 14A updates the plurality of parameters which are included in the first RNN and which are used in step S112. This updating process is carried out in advance before the information processing method S1 is carried out. Note, however, that this updating process may be periodically carried out with use of an additional sentence set. Hereinafter, in order to simplify the descriptions, it is assumed that a sentence set which is used by the relation vector generation parameter updating section 14A in the updating process is identical with a sentence set which is dealt with in the information processing method S1. Note, however, that a sentence set used in the updating process may be partially or entirely different from a sentence set which is dealt with in the information processing method S1.

First, the relation vector generation parameter updating section 14A carries out processes similar to steps S111 through S113 for each of the n relation vector generation sentences S(e1,e2)i in all of which the entities e1 and e2 of interest occur. Thus, the relation vector generation parameter updating section 14A calculates n sentence relation vectors Vi.

In a specific example of the parameter updating process, n is an integer of 2 or more. The relation vector generation parameter updating section 14A calculates a relation vector V(e1,e2)1 with use of n1 pieces among the n sentence relation vectors Vi. Moreover, the relation vector generation parameter updating section 14A calculates a relation vector V(e1,e2)2 with use of n2 pieces among the n sentence relation vectors Vi, the n2 pieces being different from the above n1 pieces. Here, n1 is an integer of 1 or more and n or less. Further, n2 is an integer of 1 or more and (n−n1) or less. The relation vector generation parameter updating section 14A updates a plurality of parameters such that the relation vectors V(e1,e2)1 and V(e1,e2)2 are similar to each other.

Specifically, the relation vector generation parameter updating section 14A calculates a degree of similarity between the relation vectors V(e1,e2)1 and V(e1,e2)2. Examples of the degree of similarity include, but not limited to, an inner product, a value obtained by multiplying a distance between vectors by a negative number, and the like. The relation vector generation parameter updating section 14A updates the plurality of parameters included in the first RNN by a gradient method such that the degree of similarity increases.

Note that the relation vector generation parameter updating section 14A may update a plurality of parameters by carrying out the updating process described above for each of a plurality of sets of "entities ep and eq of interest", instead of for one set of "entities e1 and e2 of interest". Note that p and q are each an integer of 1 or more and n or less, and p≠q. The relation vector generation parameter updating section 14A may repeat the above described updating process while changing one or both of a combination of the n1 sentence relation vectors Vi and a combination of the n2 sentence relation vectors Vi so as to update a plurality of parameters.

Effect of the Present Example Embodiment

The present example embodiment makes it possible to generate a relation vector that represents a relation between a plurality of entities of interest more appropriately, as compared with the related technique disclosed in Non-Patent Literature 1. As a result, it is possible to more accurately categorize a relation between entities of interest with use of such a relation vector and feature vectors. The following description will discuss a reason why a relation vector that is generated by the present example embodiment represents a relation more appropriately.

Here, in the related technique disclosed in Non-Patent Literature 1, information indicating a syntactic structure of a sentence in which a pair of entities of interest occurs is input into an algorithm that includes a plurality of parameters, and thus a relation vector is generated. Moreover, in the related technique, a plurality of parameters are updated from a plurality of relation vectors which have been generated from a plurality of sentences in which the pair occurs so that a syntactic structure of another sentence in which the pair occurs can be predicted. Thus, this related technique considers a syntactic structure of sentence in the generation process of a relation vector and the updating process of parameters but does not consider features of respective entities.

In contrast, in the present example embodiment, a word vector sequence is generated from each of a plurality of relation vector generation sentences in all of which a plurality of entities of interest occur. This word vector sequence not only includes information pertaining to a syntactic structure of sentence by the sequence of words, but also represents features of entities to which the word vectors respectively correspond. Here, an example of a feature of each of entities that are represented by a word vector sequence can be an occurrence position of that entity in a sentence. Another example of a feature of each of entities that are represented by a word vector sequence can be a type of that entity which is inferred from word sequences in front and behind an occurrence position. In the present example embodiment, a plurality of relation vectors are generated by inputting the generated word vector sequence into an algorithm that includes a plurality of parameters. The plurality of parameters have been updated in advance such that a plurality of relation vectors corresponding to a certain combination of entities of interest are similar to each other. Thus, such a relation vector represents not only a relation based on a syntactic structure of sentence, but also a relation based on features of respective entities of interest. Here, an example of a relation based on a feature of each of entities of interest which is represented by a relation vector can be a relation based on an occurrence position of that entity of interest in a sentence. Another example of a relation based on a feature of each of entities of interest which is represented by a relation vector can be a relation based on a type of that entity of interest which is inferred from word sequences in front and behind an occurrence position. Thus, the relation vector that is generated in the present example embodiment is generated in consideration of features of respective entities of interest, and therefore represents a relation between a plurality of entities of interest more appropriately, as compared with a relation vector of the related technique in which a relation vector is generated based solely on a syntactic structure of sentence.

Third Example Embodiment

The following description will discuss a third example embodiment of the present invention in detail with reference to the drawings. The same reference numerals are given to constituent elements which have functions identical with those described in the first example embodiment, and descriptions as to such constituent elements are not repeated.

An information processing apparatus 1B according to the present example embodiment carries out, with modification, step S12 (feature vector generation process) included in the information processing method S1 according to the first example embodiment. In other words, the information processing apparatus 1B is an example aspect obtained by altering the information processing apparatus 1 according to the first example embodiment so as to suitably carry out modified step S12.

\<Configuration of Information Processing Apparatus>

Figure 5:
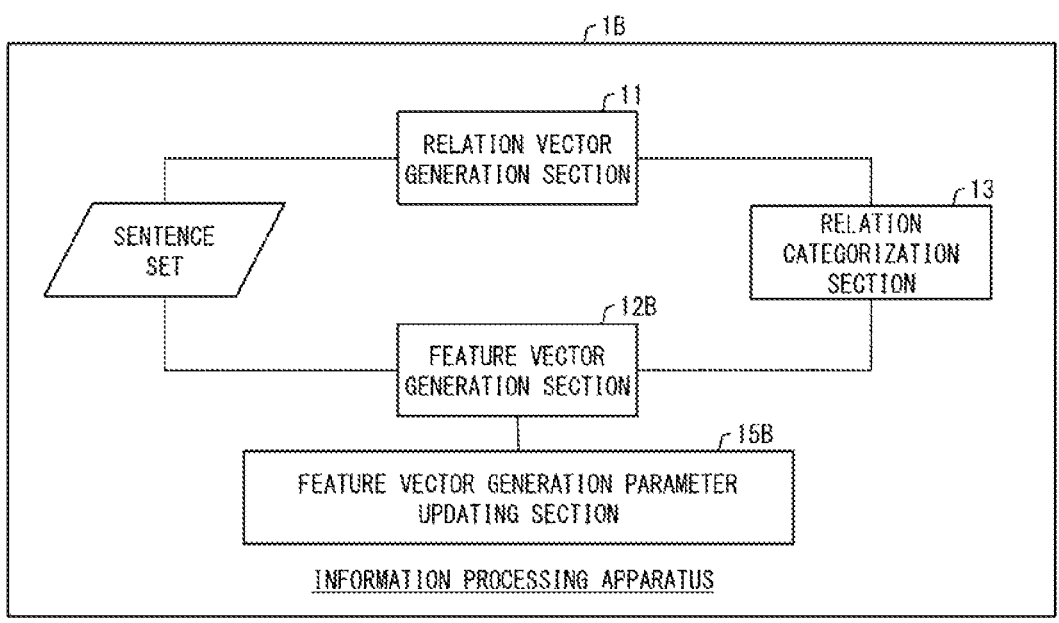
FIG. 5 is a block diagram illustrating a configuration of an information processing apparatus according to a third example embodiment of the present invention.

The following description will discuss a configuration of the information processing apparatus 1B, with reference to FIG. 5. FIG. 5 is a block diagram illustrating the configuration of the information processing apparatus 1B. As illustrated in FIG. 5, the information processing apparatus 1B is different from the information processing apparatus 1 according to the first example embodiment in that the information processing apparatus 1B includes a feature vector generation section 12B instead of the feature vector generation section 12, and further includes a feature vector generation parameter updating section 15B. The other configurations are similar to those of the information processing apparatus 1, and therefore detailed descriptions of such configurations will not be repeated.

(Feature Vector Generation Section)

The feature vector generation section 12B generates, for each of a plurality of entities of interest, a feature vector from at least one feature vector generation sentence with use of an algorithm that includes a plurality of parameters. The feature vector generation section 12B is an example configuration for realizing the "feature vector generation means" recited in claims.

(Specific Example of Algorithm)

A specific example of an algorithm that includes a plurality of parameters can be a recurrent neural network. The recurrent neural network is a neural network in which a word vector sequence is used as input, and vectors corresponding to respective word vectors constituting the word vector sequence are used as output. The recurrent neural network that is used by the feature vector generation section 12B is hereinafter referred to also as a second RNN. A plurality of parameters included in the second RNN are updated by the feature vector generation parameter updating section 15B.

(Feature Vector Generation Parameter Updating Section)

The feature vector generation parameter updating section 15B updates the plurality of parameters such that a degree of similarity increases between a feature vector and a word vector representing the entity of interest. The feature vector is generated by the feature vector generation section 12B from a sentence in which an entity of interest occurs. Specifically, the feature vector generation parameter updating section 15B updates the plurality of parameters such that a degree of similarity increases between a sentence feature vector (described later) and a word vector representing the entity of interest. Details of an updating process of updating a plurality of parameters and a specific example thereof will be described later. The feature vector generation parameter updating section 15B is an example configuration for realizing the "feature vector generation parameter updating means" recited in claims.

<Flow of Information Processing Method>

The following description will discuss a flow of an information processing method that is carried out by the information processing apparatus 1B, with reference to FIG. 6. The information processing apparatus 1B carries out, with modification, step S12 of the information processing method S1 described above with reference to FIG. 2. FIG. 6 is a flowchart illustrating a detailed flow of a feature vector generation process S12B, which is a variation of step S12. Note that the feature vector generation process S12B is carried out for each of entities ek (k=1 or 2) of interest.

(Flow of Feature Vector Generation Process)

As illustrated in FIG. 6, the feature vector generation process S12B includes steps S121 through S124. The feature vector generation section 12B carries out steps S121 through S123 for each of mk feature vector generation sentences S(ek)j.

(Step S121)

In step S121, the feature vector generation section 12B generates a word vector sequence for the feature vector generation sentence S(ek)j. Specifically, the feature vector generation section 12B replaces a word representing an entity ek of interest with a predetermined word vector. Moreover, the feature vector generation section 12B replaces a word representing an entity other than the entity ek of interest with a word vector representing that word. Thus, the feature vector generation section 12B generates a word vector sequence corresponding to the feature vector generation sentence S(ek)j. The process of this step is an example of the "second word vector sequence generation process" recited in claims.

(Specific Example of Step S121)

The following description will discuss a specific example in which, for example, the feature vector generation sentence S(e1)j is "I saw Star Wars by George Lucas at theater.", and words representing the entity e1 are "Star Wars". The feature vector generation section 12B generates a word vector sequence (VI,Vsaw,V*,Vby,VGeorge Lucas, Vat,Vtheater). Here, "VGeorge" is a word vector representing the word "George". The other word vectors constituting the word vector sequence are as described above in the specific example of step S111.

(Step S122)

In step S122, the feature vector generation section 12B inputs, into the second RNN, the word vector sequence which has been generated in step S121. Thus, the feature vector generation section 12B generates an RNN output vector sequence corresponding to the feature vector generation sentence S(ek)j. The second RNN is as described above. The plurality of parameters included in the second RNN have been updated by the feature vector generation parameter updating section 15B. The process of this step is an example of the "second RNN output vector sequence generation process" recited in claims.

(Specific Example of Step S122)

The following description will discuss a specific example of step S122 which is carried out in response to the specific example of step S121. The feature vector generation section 12B generates an RNN output vector sequence (WI,Wsaw, W*,Wby,Wgeorge Lucas,Wat,Wtheater) by inputting the word vector sequence (VI,Vsaw,V*,Vby,VGeorge Lucas, Vat,Vtheater) into the second RNN. Here, "Wgeorge" is a vector which is output in response to input of the word vector "Vgeorge". The other vectors constituting the RNN output vector sequence are as described above in the specific example of step S112.

(Step S123)

In step S123, the feature vector generation section 12B sets a vector corresponding to the entity ek of interest among the vectors constituting the RNN output vector sequence generated in step S122 to be a sentence feature vector Vj corresponding to the feature vector generation sentence S(ek)j.

(Specific Example of Step S123)

The following description will discuss a specific example of step S123 which is carried out in response to the specific examples of steps S121 and S122. The feature vector generation section 12B sets the vector "W*" corresponding to the entity e1 of interest to be a sentence feature vector Vj among the vectors constituting the RNN output vector sequence. The process of this step is an example of the "sentence feature vector setting process" recited in claims.

When the processes of steps S121 through S123 have been completed for each of the mk relation vector generation sentences S(ek)j, the feature vector generation section 12B carries out a process of the next step S124.

(Step S124)

In step S124, the feature vector generation section 12B averages, for each element, the sentence feature vectors Vj which correspond to the respective feature vector generation sentences S(ek)j and which have been set in step S123. Thus, the feature vector generation section 12B calculates a feature vector V(ek). The process of this step is an example of the "feature vector calculation process" recited in claims.

When k=1, the feature vector generation section 12B calculates a feature vector V(e1) that corresponds to the entity e1 of interest by carrying out the above described steps S121 through S124 for the entity e1 of interest. When k=2, the feature vector generation section 12B calculates a feature vector V(e2) that corresponds to the entity e2 of interest by carrying out the above described steps S121 through S124 for the entity e2 of interest.

(Specific Example of Parameter Updating Process)

The following description will discuss a specific example of an updating process in which the feature vector generation parameter updating section 15B updates the plurality of parameters which are included in the second RNN and are used in step S122. This updating process is carried out in advance before the information processing method S1 is carried out. Note, however, that this updating process may be periodically carried out with use of an additional sentence set. Hereinafter, in order to simplify the descriptions, it is assumed that a sentence set which is used by the feature vector generation parameter updating section 15B in the updating process is identical with a sentence set which is dealt with in the information processing method S1. Note, however, that a sentence set used in the updating process may be partially or entirely different from a sentence set which is dealt with in the information processing method S1.

First, the feature vector generation parameter updating section 15B carries out processes similar to steps S121 through S123 for each of m1 feature vector generation sentences S(e1)j in which the entity e1 of interest occurs. Thus, the feature vector generation parameter updating section 15B calculates m1 sentence feature vectors Vj. In a specific example of the parameter updating process, m1 is an integer of 2 or more. The feature vector generation parameter updating section 15B updates, for each of the m1 feature vector generation sentences S(e1)j, the plurality of parameters such that a degree of similarity increases between a word vector of a word representing the entity e1 of interest and the sentence feature vector Vj. The feature vector generation parameter updating section 15B calculates m2 sentence feature vectors Vj for the entity e2 of interest in a similar manner. The feature vector generation parameter updating section 15B updates, for each of the m2 feature vector generation sentences S(e2)j, the plurality of parameters such that a degree of similarity increases between a word vector of a word representing the entity e2 of interest and the sentence feature vector Vj.

Specifically, the feature vector generation parameter updating section 15B calculates, as the degree of similarity between the sentence feature vector Vj and the word vector, for example, an inner product or a value obtained by multiplying a distance between vectors by a negative number. Note, however, that the degree of similarity is not limited to these. The feature vector generation parameter updating section 15B updates the plurality of parameters included in the second RNN by a gradient method such that the degree of similarity increases.

Effect of the Present Example Embodiment

The present example embodiment makes it possible to generate a feature vector that represents a feature of an entity of interest more appropriately, as compared with the related technique disclosed in Non-Patent Literature 1. The reason for this is as follows.

For example, it is assumed that a sentence set includes a feature parameter generation sentence S(e1)j1 "I found movies by John Doe at a theater." more than a feature parameter generation sentence S(e1)j2 "I found books by John Doe at a book store.". Here, "movies" and "books" are words representing an entity e1 of interest. In this case, the feature vector generation parameter updating section 15B inputs a word vector sequence in which the word "movies" in the feature parameter generation sentence S(e1)j1 is replaced with a word vector "V*" into the second RNN to obtain a sentence feature vector Vj1. Then, the feature vector generation parameter updating section 15B updates the parameters of the second RNN such that the sentence feature vector Vj1 is similar to an original word vector "Vmovies". The feature vector generation parameter updating section 15B inputs a word vector sequence in which the word "books" in the feature parameter generation sentence S(e1) j2 is replaced with a word vector "V" into the second RNN to obtain a sentence feature vector Vj2. Then, the feature vector generation parameter updating section 15B updates the parameters of the second RNN such that the sentence feature vector Vj2 is similar to an original word vector "Vbooks". Here, the number of feature parameter generation sentences S(e1)j1 is larger than that of S(e1)j2. Therefore, the plurality of parameters are updated such that a feature vector V(e1) that represents a feature that "the entity e1 of interest is more likely to be found in a theater than in a book store" is output. In other words, in the feature vector V(e1) output from the second RNN that includes the updated plurality of parameters, information that "the entity e1 of interest has a greater degree of likelihood of being a movie than a book" is embedded. Furthermore, in other words, the feature vector V(e1) is obtained by embedding information that matches a feature of the entity e1 of interest which is inferred from a relative magnitude between the number of S(e1)j1 and the number of S(e1)j2 in a sentence set. Therefore, the feature vector that is generated in the present example embodiment represents a feature of an entity of interest more appropriately.

Moreover, by using the feature vector which is generated in the present example embodiment, the present example embodiment makes it possible to categorize a relation between a plurality of entities of interest more accurately, as compared with the related technique disclosed in Non-Patent Literature 1. The reason for this is as follows.

Here, in the related technique disclosed in Non-Patent Literature 1, a relation between entities is categorized based on a syntactic structure between words corresponding to two entities of interest. Therefore, this related technique cannot distinguish a difference between modifiers ("at a theater" and "at a book store") which do not directly correspond to a relation between two entities of interest ("some story" and "John Doe") in the following sentence 1 and sentence 2. Therefore, this related technique cannot distinguish a relation between these two entities of interest in these two sentences.

Sentence 1: "I found Some Story by John Doe at a theater."

Sentence 2: "I found Some Story by John Doe at a book store."

In contrast, in the present example embodiment, a feature vector V(e1) of an entity e1 of interest that corresponds to the words "some story" is generated with use of the second RNN described above. Here, in a case where a sentence set that includes many sentences 1 is referred to, the feature vector V(e1) represents a feature that "the entity e1 of interest is more likely to be found in a theater than in a book store". Meanwhile, in a case where a sentence set that includes many sentences 2 is referred to, the feature vector V(e1) represents a feature that "the entity e1 of interest is more likely to be found in a book store than in a theater". Therefore, in the present example embodiment, a relation between "some story" and "Jone Doe" in the sentence set that includes many sentences 1 can be categorized as "a work which has been produced by a movie director". Moreover, in the present example embodiment, a relation between "some story" and "Jone Doe" in the sentence set that includes many sentences 2 can be categorized as "a book which has been written by a writer". Thus, in the present example embodiment, a relation is categorized with use of a feature vector that reflects a feature of an entity of interest in a sentence set. Therefore, the present example embodiment makes it possible to categorize a relation with higher accuracy, as compared with the related technique disclosed in Non-Patent Literature.

Fourth Example Embodiment

The following description will discuss a fourth example embodiment of the present invention in detail with reference to the drawings. The same reference numerals are given to constituent elements which have functions identical with those described in the first example embodiment, and descriptions as to such constituent elements are not repeated.

An information processing apparatus 1C according to the present example embodiment carries out, with modification, step S13 (relation categorization process) included in the information processing method S1 according to the first example embodiment. In other words, the information processing apparatus 1C is an example aspect obtained by altering the information processing apparatus 1 according to the first example embodiment so as to suitably carry out modified step S13.

<Configuration of Information Processing Apparatus>

Figure 7:
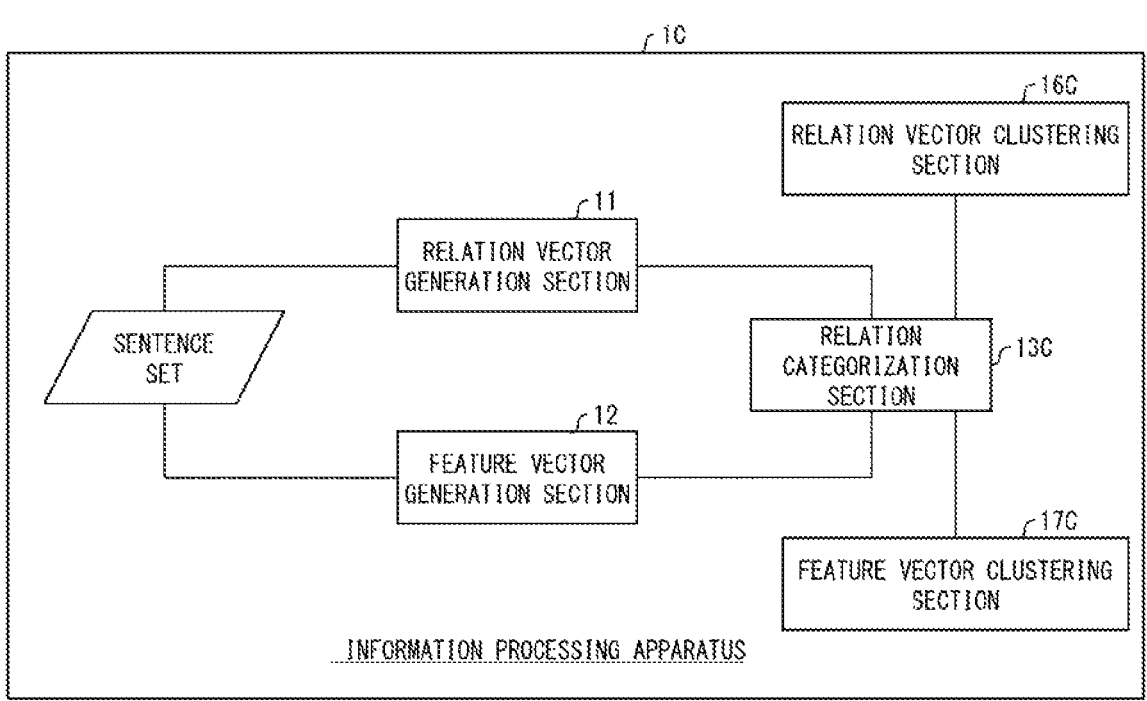
FIG. 7 is a block diagram illustrating a configuration of an information processing apparatus according to a fourth example embodiment of the present invention.

The following description will discuss a configuration of the information processing apparatus 1C, with reference to FIG. 7. FIG. 7 is a block diagram illustrating the configuration of the information processing apparatus 1C. As illustrated in FIG. 7, the information processing apparatus 1C is different from the information processing apparatus 1 according to the first example embodiment in that the information processing apparatus 1C includes a relation categorization section 13C instead of the relation categorization section 13, and further includes a relation vector clustering section 16C and a feature vector clustering section 17C. The other configurations are similar to those of the information processing apparatus 1, and therefore detailed descriptions of such configurations will not be repeated.

(Relation Vector Clustering Section)

The relation vector clustering section 16C generates a cluster of relation vectors. A known technique such as, but not limited to, a K-Means method can be applied to the process of generating a cluster of relation vectors. The relation vector clustering section 16C classifies a plurality of relation vectors to generate a plurality of clusters. The relation vector clustering section 16C is an example configuration for realizing the "relation vector clustering means" recited in claims.

(Feature Vector Clustering Section)

The feature vector clustering section 17C generates a cluster of feature vectors. A known technique such as, but not limited to, a K-Means method can be applied to the process of generating a cluster of feature vectors. The feature vector clustering section 17C classifies a plurality of feature vectors to generate a plurality of clusters. The feature vector clustering section 17C is an example configuration for realizing the "feature vector clustering means" recited in claims.

(Relation Categorization Section)

The relation categorization section 13C carries out a relation vector categorization process, a feature vector categorization process, and a categorization result combining process. The relation vector categorization process is a process of categorizing a relation vector which has been generated by the relation vector generation section 11. The feature vector categorization process is a process of categorizing each of feature vectors generated by the feature vector generation section 12. The categorization result combining process is a process of combining a categorization result obtained in the relation vector categorization process with a categorization result obtained in the feature vector categorization process to categorize a relation between a plurality of entities of interest. The relation categorization section 13C is an example configuration for realizing the "relation categorization means" recited in claims.

<Flow of Information Processing Method>

Figure 8:
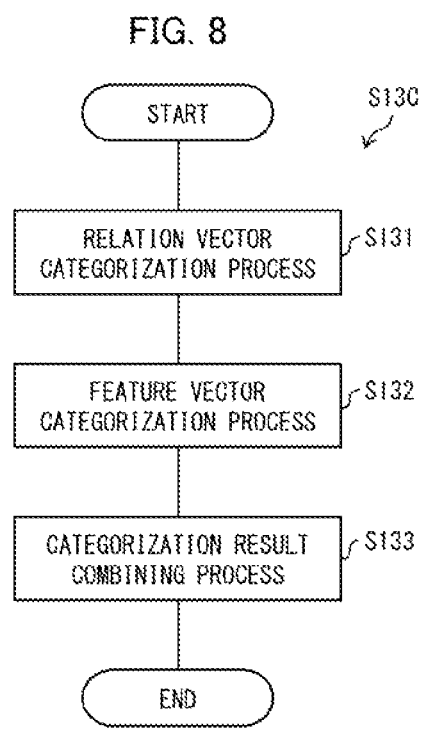
FIG. 8 is a flowchart illustrating a flow of an information processing method according to the fourth example embodiment of the present invention.

The following description will discuss a flow of an information processing method that is carried out by the information processing apparatus 1C, with reference to FIG. 8. The information processing apparatus 1C carries out, with modification, step S13 of the information processing method S1 described above with reference to FIG. 2. FIG. 8 is a flowchart illustrating a detailed flow of the relation categorization process S13C which is a variation of step S13.

(Flow of Relation Categorization Process)

As illustrated in FIG. 8, the relation categorization process S13C includes steps S131 through S133.

(Step S131)

In step S131, the relation categorization section 13C carries out the relation vector categorization process. Specifically, the relation categorization section 13C determines whether or not a relation vector V(e1,e2) which has been generated by the relation vector generation section 11 belongs to any of clusters which have been generated by the relation vector clustering section 16C. Hereinafter, the determined cluster is referred to as a relation cluster C(e1,e2). In a case where a weight is obtained for each of a plurality of clusters in the relation vector categorization process, a cluster with a largest weight is regarded as the relation cluster C(e1,e2).

(Step S132)

In step S132, the relation categorization section 13C carries out the feature vector categorization process. Specifically, the relation categorization section 13C determines whether or not each of feature vectors V(ek) which have been generated by the feature vector generation section 12 belongs to any of clusters which have been generated by the feature vector clustering section 17C. Hereinafter, the determined cluster is referred to as a feature cluster C(ek). In a case where a weight is obtained for each of a plurality of clusters in the feature vector categorization process, a cluster with a largest weight is regarded the feature cluster C(ek).

(Step S133)

In step S133, the relation categorization section 13C carries out the categorization result combining process. Specifically, the relation categorization section 13C categorizes a relation between a plurality of entities e1 and e2 of interest by combining the categorization results obtained in steps S131 and S132. For example, the relation categorization section 13C may use a direct product of a relation cluster C(e1,e2), a feature cluster C(e1), and a feature cluster C(e2) as a categorization result of the relation between the plurality of entities e1 and e2 of interest.

Effect of the Present Example Embodiment

In the present example embodiment, a relation cluster to which a relation vector corresponding to a plurality of entities of interest belongs, and a feature cluster to which a feature vector corresponding to each of entities of interest belongs are combined, and thus a relation between the plurality of entities of interest is categorized. By separately carrying out categorization of a relation vector and categorization of feature vectors in this manner, a dimension of vectors to be considered is smaller, as compared with a case where these vectors are categorized together. As a result, the categorization process of a relation becomes easier, and accuracy is improved.

Moreover, in the present example embodiment, the categorization result combining process is carried out, and this makes it possible to categorize a relation between a plurality of entities of interest into different types whose number is as much as a product of a total number of relation clusters and a total number of feature clusters. Therefore, the capability to categorize a sufficient number of types of relations is ensured even if a total number of clusters necessary in each of the relation vector categorization process and the feature vector categorization process is reduced. As a result, the categorization process of a relation becomes easier, and accuracy is improved.

Therefore, the present example embodiment makes it possible to more accurately categorize a relation between a plurality of entities of interest.

Example

In this Example, the above described second through fourth example embodiments were carried out in combination, and verification was carried out with respect to categorization of a relation between a plurality of entities of interest. That is, in this Example, a categorization result was obtained by carrying out the relation vector generation process S11A, the feature vector generation process S12B, and the relation categorization process S13C. The categorization result is referred to as a categorization result of Example.

Comparative Example

As a comparative example, a relation between a plurality of entities of interest was categorized with use of a related technique, and thus a categorization result was obtained. As the related technique, Open IE 5.1 was used. Open IE 5.1 is a known technique for categorizing a relation between entities based on a syntactic structure of sentence.

(Target Sentence Set)

In Example and Comparative Example, categorization of a relation was carried out with respect to the same sentence set. The sentence set which was used (hereinafter, "target sentence set") was a part of a large-scale corpus ClueWeb12. The large-scale corpus ClueWeb12 is a public data set obtained from the web by crawling. In Example and Comparative Example, the FACC1 database was also used. The FACC1 database includes annotation data indicating, for each of words in sentences included in ClueWeb12, whether or not that word corresponds to any of entities registered in the online database Freebase, and which one of the entities corresponds to that word.

(Correct Answer Data)

The following correct answer data was used in order to calculate accuracy of categorization results in Example and Comparative Example. That is, a predicate which holds true for a certain pair of entities in Freebase was regarded as correct answer data which is a categorization result of a correct relation. Moreover, from among predicates registered in Freebase, approximately 100 types of predicates were selected which hold true for a pair of entities that frequently occurs in ClueWeb12. Then, among pairs of entities for which those predicates held true and were registered in Freebase, pairs of entities which occurred in the target sentence set were regarded as pairs of entities of interest to be categorized. Note that the correct answer data was used to calculate accuracy of the categorization results, and was not referred to in the updating process and the categorization process in Example and Comparative Example.

(Verification of Categorization Result)

Figure 9:
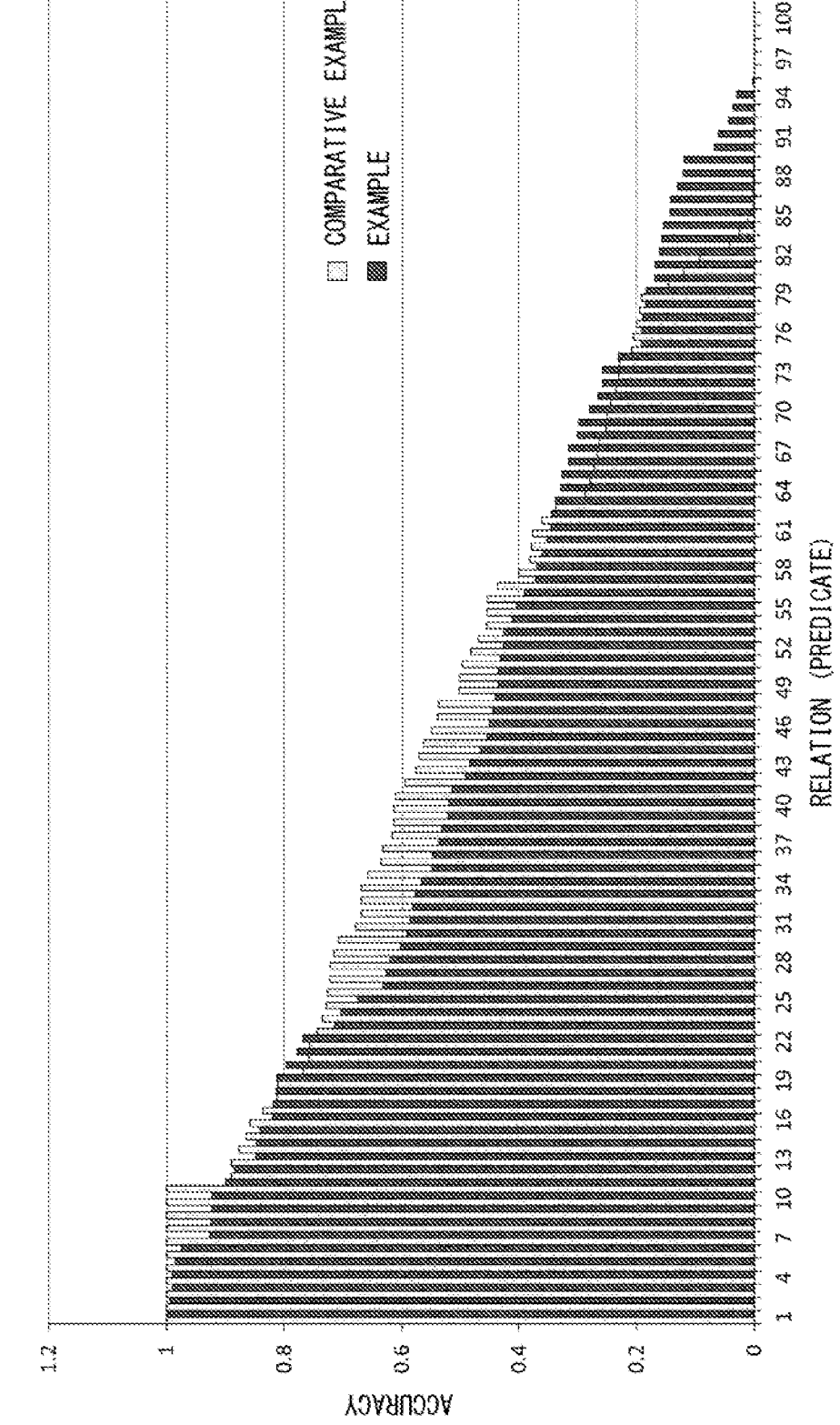
FIG. 9 is a diagram for comparing a categorization result in Example of the present invention with a categorization result in Comparative Example.

The following description will discuss Example and Comparative Example with reference to FIG. 9. FIG. 9 is a graph for comparing a categorization result in Example with a categorization result in Comparative Example. In FIG. 9, the horizontal axis represents a relation defined by each of predicates. The vertical axis indicates accuracy of a categorization result for a pair of entities of interest having that relation. More specifically, a degree of conformity between a relation obtained by categorizing a pair of entities of interest by each of Example and Comparative Example and a relation defined by each of predicates shown in the horizontal axis was evaluated based on a degree of overlap between pairs of entities of interest which were categorized into the respective relations. Then, the degrees of conformity were weighted and averaged according to the number of pairs of entities of interest which had been categorized, and a value thus obtained was regarded as accuracy. As illustrated in FIG. 9, the categorization result in Example showed that it was possible to carry out categorization, although accuracy was lower than that in Comparative Example, for a relation for which accuracy of the categorization result in Comparative Example was relatively high. Further, the categorization result in Example showed that it was possible to carry out categorization with higher accuracy than Comparative Example for a relation for which accuracy of the categorization result in Comparative Example was low.

In other words, Example makes it possible to accurately categorize a relation even for a pair of entities of interest for which categorization of the relation is difficult in Comparative Example. Further, Example makes it possible to categorize more relations, as compared with Comparative Example.

Fifth Example Embodiment

The following description will discuss a fifth example embodiment of the present invention in detail with reference to the drawings. The fifth example embodiment is an example aspect obtained by altering the second example embodiment. The same reference numerals are given to constituent elements which have functions identical with those described in the second example embodiment, and descriptions as to such constituent elements are not repeated.

<Configuration of Information Processing Apparatus>

Figure 10:
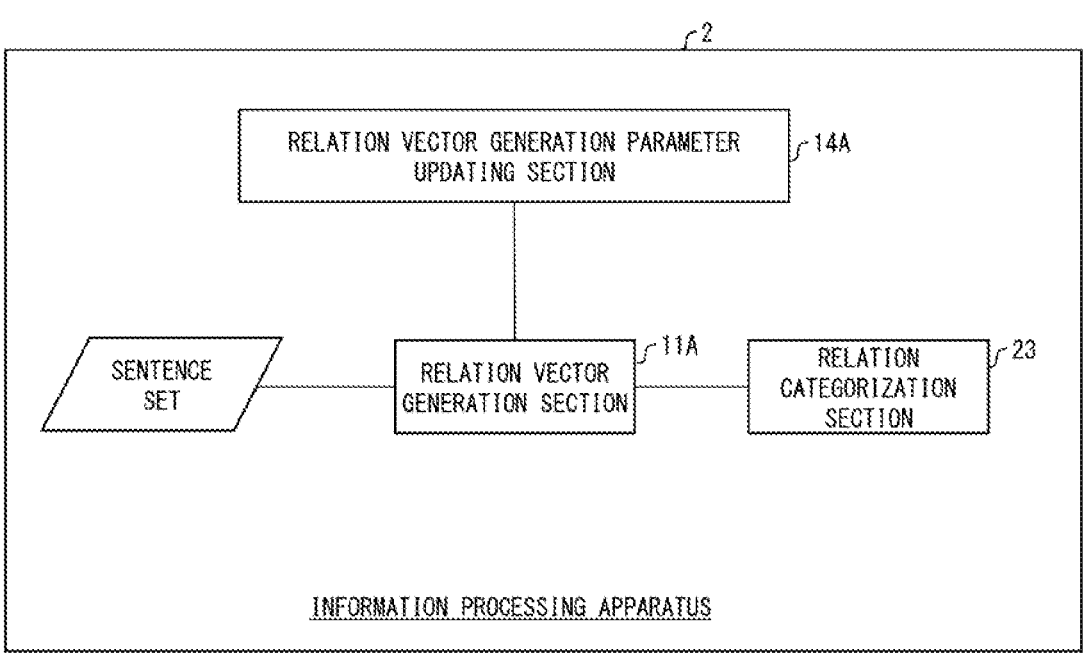
FIG. 10 is a block diagram illustrating a configuration of an information processing apparatus according to a fifth example embodiment of the present invention.

The following description will discuss a configuration of an information processing apparatus 2, with reference to FIG. 10. FIG. 10 is a block diagram illustrating the configuration of the information processing apparatus 2. As illustrated in FIG. 10, the information processing apparatus 2 is different from the information processing apparatus 1A according to the second example embodiment in that the information processing apparatus 2 does not include the feature vector generation section 12 and includes a relation categorization section 23 instead of the relation categorization section 13. The other configurations are similar to those of the information processing apparatus 1A, and therefore detailed descriptions of such configurations will not be repeated.

(Relation Categorization Section)

The relation categorization section 23 categorizes a relation between a plurality of entities of interest with use of a relation vector which has been generated by the relation vector generation section 11A. The relation categorization section 23 is an example configuration for realizing the "relation categorization means" recited in claims.

<Flow of Information Processing Method>

Figure 11:
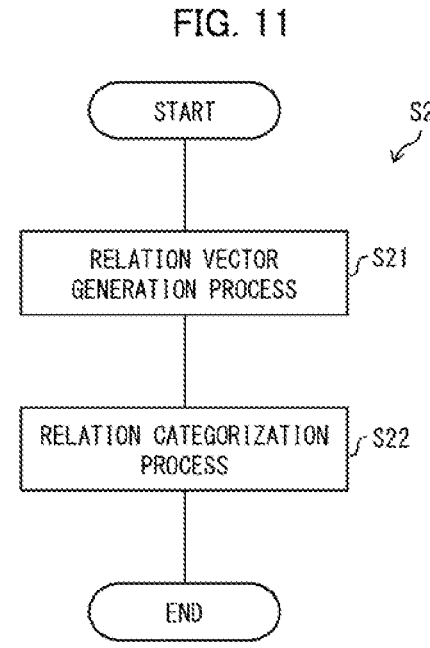
FIG. 11 is a flowchart illustrating a flow of an information processing method according to the fifth example embodiment of the present invention.

The following description will discuss a flow of an information processing method S2 that is carried out by the information processing apparatus 2, with reference to FIG. 11. FIG. 11 is a flowchart illustrating the flow of the information processing method S2. As illustrated in FIG. 11, the information processing method S2 includes steps S21 and S22.

(Step S21)

The process of step S21 is similar to the process of step S11A according to the second example embodiment. Thus, the relation vector generation section 11A generates a relation vector V(e1,e2) from at least one relation vector generation sentence S(e1,e2) with use of an algorithm that includes a plurality of parameters.

(Step S22)

In step S22, the relation categorization section 23 categorizes a relation between a plurality of entities e1 and e2 of interest with use of the relation vector V(e1,e2) which has been generated by the relation vector generation section 11A. For example, the relation categorization section 23 may categorize the relation by generating a cluster of the relation vectors V(e1,e2).

Effect of the Present Example Embodiment

The present example embodiment makes it possible to generate a relation vector that represents a relation between a plurality of entities of interest more appropriately, as compared with the related technique disclosed in Non-Patent Literature 1. The reason for this is as described above in the effect of the second example embodiment. As a result, the present example embodiment employs such a relation vector, and it is therefore possible to more accurately categorize a relation between a plurality of entities of interest.

[Software Implementation Example]

The functions of part of or all of the information processing apparatuses 1, 1A, 1B, 1C, and 2 can be realized by hardware such as an integrated circuit (IC chip) or can be alternatively realized by software.

Figure 12:
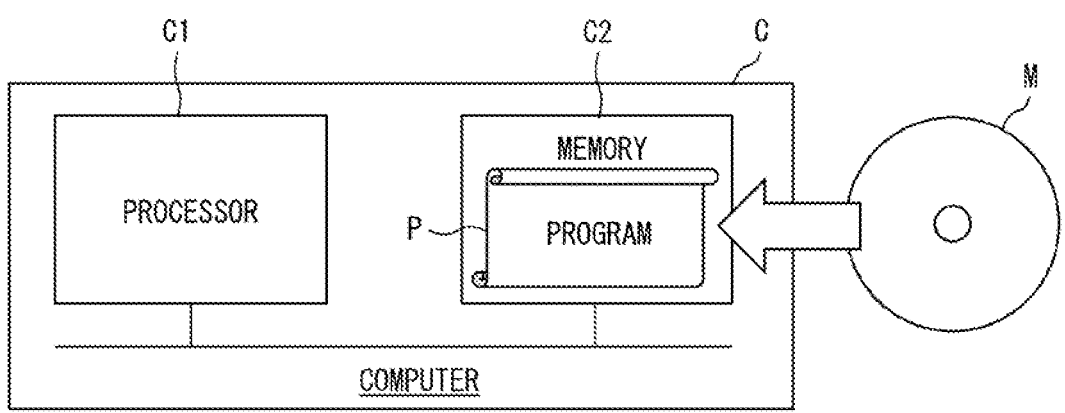
FIG. 12 is a block diagram illustrating an example of a hardware configuration of the information processing apparatus according to each of the example embodiments of the present invention.

In the latter case, each of the information processing apparatuses 1, 1A, 1B, 1C, and 2 is realized by, for example, a computer that executes instructions of a program that is software realizing the foregoing functions. FIG. 12 illustrates an example of such a computer (hereinafter, referred to as "computer C"). The computer C includes at least one processor C1 and at least one memory C2. The memory C2 stores a program P for causing the computer C to function as the information processing apparatuses 1, 1A, 1B, 1C, and 2. In the computer C, the processor C1 reads the program P from the memory C2 and executes the program P, so that the functions of the information processing apparatuses 1, 1A, 1B, 1C, and 2 are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some of or all of the foregoing example embodiments can also be described as below. Note, however, that the present invention is not limited to the following supplementary notes.

(Supplementary Note 1)

An information processing apparatus, including: a relation vector generation means of generating a relation vector that represents a relation between a plurality of entities of interest from at least one relation vector generation sentence which has been selected from a sentence set and in which the plurality of entities of interest occur; a feature vector generation means of generating, for each of the plurality of entities of interest, a feature vector that represents a feature of that entity of interest from at least one feature vector generation sentence which has been selected from the sentence set and in which that entity of interest occurs; and a relation categorization means of categorizing a relation between the plurality of entities of interest with use of a relation vector which has been generated by the relation vector generation means and feature vectors which have been generated by the feature vector generation means.

According to the configuration, a relation between a plurality of entities of interest is categorized with use of a relation vector that has been generated from a relation vector generation sentence in which the plurality of entities of interest occur, and feature vectors that have been generated from feature vector generation sentences in which the respective entities of interest occur. As a result, features of respective entities of interest are considered in addition to a relation between the plurality of entities of interest. Therefore, it is possible to more accurately categorize a relation between the entities of interest.

(Supplementary Note 2)

The information processing apparatus according to supplementary note 1, in which: the relation vector generation means generates the relation vector from the at least one relation vector generation sentence with use of an algorithm that includes a plurality of parameters; and the information processing apparatus further includes a relation vector generation parameter updating means of updating the plurality of parameters such that a degree of similarity increases between a plurality of relation vectors which are generated by the relation vector generation means from a plurality of sentences in all of which the plurality of entities of interest occur.

According to the configuration, it is possible to generate a relation vector that represents a relation between a plurality of entities of interest more appropriately.

(Supplementary Note 3)

The information processing apparatus according to supplementary note 2, in which: the relation vector generation means carries out, for each relation vector generation sentence, (1) a first word vector sequence generation process of generating a word vector sequence that corresponds to that relation vector generation sentence by replacing a word representing each of the plurality of entities of interest with a predetermined word vector and by replacing a word representing an entity other than the plurality of entities of interest with a word vector representing that word, (2) a first RNN output vector sequence generation process of generating an RNN output vector sequence that corresponds to that relation vector generation sentence by inputting, into a recurrent neural network, the word vector sequence which has been generated in the first word vector sequence generation process, the recurrent neural network using a word vector sequence as input, and vectors corresponding to respective word vectors constituting the word vector sequence as output, (3) a sentence relation vector calculation process of calculating a sentence relation vector that corresponds to that relation vector generation sentence by averaging, for each element, vectors constituting the RNN output vector sequence which has been generated in the first RNN output vector sequence generation process, and (4) a relation vector calculation process of calculating the relation vector by averaging, for each element, sentence relation vectors which have been calculated in the sentence relation vector calculation process and which correspond to respective relation vector generation sentences; and the relation vector generation parameter updating means updates a parameter of the recurrent neural network such that a degree of similarity increases between a plurality of relation vectors that are generated by the relation vector generation means from a plurality of sentences in all of which a plurality of entities occur.

According to the configuration, it is possible to cause a recurrent neural network to learn so as to generate a relation vector that represents a relation between a plurality of entities of interest more appropriately.

(Supplementary Note 4)

The information processing apparatus according to any one of supplementary notes 1 through 3, in which: the feature vector generation means generates, for each of the plurality of entities of interest, the feature vector from the at least one feature vector generation sentence with use of an algorithm that includes a plurality of parameters; and the information processing apparatus further includes a feature vector generation parameter updating means of updating the plurality of parameters such that a degree of similarity increases between a feature vector that is generated by the feature vector generation means from a sentence in which an entity of interest occurs and a word vector that represents the entity of interest.

According to the configuration, it is possible to generate feature vectors that represent features of respective entities of interest more appropriately.

(Supplementary Note 5)

The information processing apparatus according to supplementary note 4, in which: the feature vector generation means carries out, for each of the plurality of entities of interest and for each feature vector generation sentence, (1) a second word vector sequence generation process of generating a word vector sequence that corresponds to that feature vector generation sentence by replacing a word representing that entity of interest with a predetermined word vector and replacing a word representing an entity other than that entity of interest with a word vector representing the word, (2) a second RNN output vector sequence generation process of generating an RNN output vector sequence that corresponds to that feature vector generation sentence by inputting, into a recurrent neural network, the word vector sequence which has been generated in the second word vector sequence generation process, the recurrent neural network using a word vector sequence as input, and vectors corresponding to respective word vectors constituting that word vector sequence as output, (3) a sentence feature vector setting process of setting, from among vectors constituting the RNN output vector sequence generated in the second RNN output vector sequence generation process, a vector corresponding to that entity of interest to be a sentence feature vector that corresponds to that feature vector generation sentence, and (4) a feature vector calculation process of calculating the feature vector by averaging, for each element, sentence feature vectors which have been set in the sentence feature vector setting process and which correspond to respective feature vector generation sentences; the feature vector generation parameter updating means updates a parameter of the recurrent neural network such that a degree of similarity increases between a sentence feature vector that is generated by the feature vector generation means from a sentence in which an entity of interest occurs and a word vector that represents the entity of interest.

According to the configuration, it is possible to cause a recurrent neural network to learn so as to generate feature vectors that represent features of respective entities of interest more appropriately.

(Supplementary Note 6)

The information processing apparatus according to any one of supplementary notes 1 through 5, in which: the relation categorization means carries out a relation vector categorization process of categorizing a relation vector which has been generated by the relation vector generation means, a feature vector categorization process of categorizing each of feature vectors which have been generated by the feature vector generation means, and a categorization result combining process of categorizing a relation between the plurality of entities of interest by combining a categorization result obtained in the relation vector categorization process and a categorization result obtained in the feature vector categorization process together.

According to the configuration, results of separately categorizing a relation vector and each of feature vectors are combined, and this makes it possible to further accurately categorize a relation between a plurality of entities of interest.

(Supplementary Note 7)

The information processing apparatus according to supplementary note 6, further including: a relation vector clustering means of generating a cluster of relation vectors; and a feature vector clustering means of generating a cluster of feature vectors, the relation categorization means carrying out the relation vector categorization process by determining a cluster to which a relation vector generated by the relation vector generation means belongs, the cluster having been generated by the relation vector clustering means, and the relation categorization means carrying out the feature vector categorization process by determining a cluster to which each of feature vectors generated by the feature vector generation means belongs, the cluster having been generated by the feature vector clustering means.

According to the configuration, it is possible to obtain a categorization result of a relation vector and a categorization result of each of the feature vectors which are used for obtaining an ultimate categorization result.

(Supplementary Note 8)

An information processing method, including: generating a relation vector that represents a relation between a plurality of entities of interest from at least one relation vector generation sentence which has been selected from a sentence set and in which the plurality of entities of interest occur; generating, for each of the plurality of entities of interest, a feature vector that represents a feature of that entity of interest from at least one feature vector generation sentence which has been selected from the sentence set and in which that entity of interest occurs; and categorizing a relation between the plurality of entities of interest with use of the relation vector and the feature vectors which have been respectively generated for the plurality of entities of interest.

According to the configuration, an effect similar to that of supplementary note 1 is brought about.

(Supplementary Note 9)

A program for causing a computer to function as an information processing apparatus, the program causing the computer to function as: a relation vector generation means of generating a relation vector that represents a relation between a plurality of entities of interest from at least one relation vector generation sentence which has been selected from a sentence set and in which the plurality of entities of interest occur; a feature vector generation means of generating, for each of the plurality of entities of interest, a feature vector that represents a feature of that entity of interest from at least one feature vector generation sentence which has been selected from the sentence set and in which that entity of interest occurs; and a relation categorization means of categorizing a relation between the plurality of entities of interest with use of a relation vector which has been generated by the relation vector generation means and feature vectors which have been generated by the feature vector generation means.

According to the configuration, an effect similar to that of supplementary note 1 is brought about.

(Supplementary Note 10)

An information processing apparatus, including: a relation vector generation means of generating a relation vector with use of an algorithm including a plurality of parameters from at least one relation vector generation sentence which has been selected from a sentence set and in which a plurality of entities of interest occur, the relation vector representing a relation between the plurality of entities of interest; a relation vector generation parameter updating means of updating the plurality of parameters such that a degree of similarity increases between a plurality of relation vectors that are generated by the relation vector generation means from a plurality of sentences in all of which the plurality of entities of interest occur; and a relation categorization means of categorizing a relation between the plurality of entities of interest with use of a relation vector which has been generated by the relation vector generation means.

According to the configuration, an effect similar to that of supplementary note 1 is brought about.

(Supplementary Note 11)

An information processing method, including: generating a relation vector with use of an algorithm including a plurality of parameters from at least one relation vector generation sentence which has been selected from a sentence set and in which a plurality of entities of interest occur, the relation vector representing a relation between the plurality of entities of interest; updating the plurality of parameters such that a degree of similarity increases between a plurality of relation vectors that are generated from a plurality of sentences in all of which the plurality of entities of interest occur; and categorizing a relation between the plurality of entities of interest with use of the relation vector.

According to the configuration, an effect similar to that of supplementary note 1 is brought about.

(Supplementary Note 12)

A program for causing a computer to function as an information processing apparatus, the program causing the computer to function as: a relation vector generation means of generating a relation vector with use of an algorithm including a plurality of parameters from at least one relation vector generation sentence which has been selected from a sentence set and in which a plurality of entities of interest occur, the relation vector representing a relation between the plurality of entities of interest; a relation vector generation parameter updating means of updating the plurality of parameters such that a degree of similarity increases between a plurality of relation vectors that are generated by the relation vector generation means from a plurality of sentences in all of which the plurality of entities of interest occur; and a relation categorization means of categorizing a relation between the plurality of entities of interest with use of a relation vector which has been generated by the relation vector generation means.

According to the configuration, an effect similar to that of supplementary note 1 is brought about.

(Supplementary Note 13)

An information processing apparatus, including at least one processor, the at least one processor carrying out: a relation vector generation process of generating a relation vector that represents a relation between a plurality of entities of interest from at least one relation vector generation sentence which has been selected from a sentence set and in which the plurality of entities of interest occur; a feature vector generation process of generating, for each of the plurality of entities of interest, a feature vector that represents a feature of that entity of interest from at least one feature vector generation sentence which has been selected from the sentence set and in which that entity of interest occurs; and a relation categorization process of categorizing a relation between the plurality of entities of interest with use of a relation vector which has been generated in the relation vector generation process and feature vectors which have been generated in the feature vector generation process.

(Supplementary Note 14)

Furthermore, some of or all of the foregoing example embodiments can also be expressed as below.

An information processing apparatus, including at least one processor, the at least one processor carrying out: a relation vector generation process of generating a relation vector with use of an algorithm including a plurality of parameters from at least one relation vector generation sentence which has been selected from a sentence set and in which a plurality of entities of interest occur, the relation vector representing a relation between the plurality of entities of interest; a relation vector generation parameter updating process of updating the plurality of parameters such that a degree of similarity increases between relation vectors that are generated in the relation vector generation process from each of a plurality of sentences in all of which the plurality of entities of interest occur; and a relation categorization process of categorizing a relation between the plurality of entities of interest with use of a relation vector which has been generated in the relation vector generation process.

Note that the information processing apparatus according to supplementary note 14 can further include a memory. The memory may store a program for causing the processor to carry out the relation vector generation process, the feature vector generation process, and the relation categorization process. The program can be stored in a computer-readable non-transitory tangible storage medium. The program can be stored in a computer-readable non-transitory tangible storage medium.

The information processing apparatus according to supplementary note 15 can further include a memory. The memory may store a program for causing the processor to carry out the relation vector generation process, the relation vector generation parameter updating process, and the relation categorization process. The program can be stored in a computer-readable non-transitory tangible storage medium.

REFERENCE SIGNS LIST 1, 1A, 1B, 1C, 2: Information processing apparatus
11, 11A: Relation vector generation section
12, 12B: Feature vector generation section
13, 13C, 23: Relation categorization section
14A: Relation vector generation parameter updating section
15B, 15B, 15B: Feature vector generation parameter updating section
16C: Relation vector clustering section
17C: Feature vector clustering section
C1: Processor
C2: Memory

What is claimed is:

1. An information processing apparatus, comprising at least one processor, the at least one processor carrying out:

a relation vector generation process of generating a relation vector that represents a relation between a plurality of entities of interest from at least one relation vector generation sentence which has been selected from a sentence set and in which the plurality of entities of interest occur;

a feature vector generation process of generating, for each of the plurality of entities of interest, a feature vector that represents a feature of that entity of interest from at least one feature vector generation sentence which has been selected from the sentence set and in which that entity of interest occurs; and a relation categorization process of categorizing a relation between the plurality of entities of interest with use of a relation vector which has been generated in the relation vector generation process and feature vectors which have been generated in the feature vector generation process, wherein:

in the feature vector generation process, the at least one processor generates, for each of the plurality of entities of interest, the feature vector from the at least one feature vector generation sentence with use of an algorithm that includes a plurality of parameters; and the at least one processor further carries out a feature vector generation parameter updating process of updating the plurality of parameters such that a degree of similarity increases between a feature vector that is generated in the feature vector generation process from a sentence in which an entity of interest occurs and a word vector that represents the entity of interest, and wherein:

in the feature vector generation process, the at least one processor carries out, for each of the plurality of entities of interest and for each feature vector generation sentence, (1) a second word vector sequence generation process of generating a word vector sequence that corresponds to that feature vector generation sentence by replacing a word representing that entity of interest with a predetermined word vector and replacing a word representing an entity other than that entity of interest with a word vector representing the word, (2) a second Recurrent Neural Network (RNN) output vector sequence generation process of generating an Recurrent Neural Network (RNN) output vector sequence that corresponds to that feature vector generation sentence by inputting, into a recurrent neural network, the word vector sequence which has been generated in the second word vector sequence generation process, the recurrent neural network using a word vector sequence as input, and vectors corresponding to respective word vectors constituting that word vector sequence as output, (3) a sentence feature vector setting process of setting, from among vectors constituting the RNN output vector sequence generated in the second Recurrent Neural Network (RNN) output vector sequence generation process, a vector corresponding to that entity of interest to be a sentence feature vector that corresponds to that feature vector generation sentence, and (4) a feature vector calculation process of calculating the feature vector by averaging, for each element, sentence feature vectors which have been set in the sentence feature vector setting process and which correspond to respective feature vector generation sentences; and in the feature vector generation parameter updating process, the at least one processor updates a parameter of the recurrent neural network such that a degree of similarity increases between a sentence feature vector that is generated in the feature vector generation process from a sentence in which an entity of interest occurs and a word vector that represents the entity of interest.

2. The information processing apparatus according to claim 1, wherein:

in the relation vector generation process, the at least one processor generates the relation vector from the at least one relation vector generation sentence with use of an algorithm that includes a plurality of parameters; and the at least one processor further carries out a relation vector generation parameter updating process of updating the plurality of parameters such that a degree of similarity increases between a plurality of relation vectors which are generated in the relation vector generation process from a plurality of sentences in all of which the plurality of entities of interest occur.

3. The information processing apparatus according to claim 2, wherein:

in the relation vector generation process, the at least one processor carries out, for each relation vector generation sentence, (1) a first word vector sequence generation process of generating a word vector sequence that corresponds to that relation vector generation sentence by replacing a word representing each of the plurality of entities of interest with a predetermined word vector and by replacing a word representing an entity other than the plurality of entities of interest with a word vector representing that word, (2) a first Recurrent Neural Network (RNN) output vector sequence generation process of generating an Recurrent Neural Network (RNN) output vector sequence that corresponds to that relation vector generation sentence by inputting, into a recurrent neural network, the word vector sequence which has been generated in the first word vector sequence generation process, the recurrent neural network using a word vector sequence as input, and vectors corresponding to respective word vectors constituting the word vector sequence as output, (3) a sentence relation vector calculation process of calculating a sentence relation vector that corresponds to that relation vector generation sentence by averaging, for each element, vectors constituting the Recurrent Neural Network (RNN) output vector sequence which has been generated in the first Recurrent Neural Network (RNN) output vector sequence generation process, and (4) a relation vector calculation process of calculating the relation vector by averaging, for each element, sentence relation vectors which have been calculated in the sentence relation vector calculation process and which correspond to respective relation vector generation sentences; and in the relation vector generation parameter updating process, the at least one processor updates a parameter of the recurrent neural network such that a degree of similarity increases between a plurality of relation vectors that are generated in the relation vector generation process from a plurality of sentences in all of which a plurality of entities occur.

4. The information processing apparatus according to claim 1, wherein:

in the relation categorization process, the at least one processor carries out a relation vector categorization process of categorizing a relation vector which has been generated in the relation vector generation process, a feature vector categorization process of categorizing each of feature vectors which have been generated in the feature vector generation process, and a categorization result combining process of categorizing a relation between the plurality of entities of interest by combining a categorization result obtained in the relation vector categorization process and a categorization result obtained in the feature vector categorization process together.

5. The information processing apparatus according to claim 4, wherein:

the at least one processor further carries out a relation vector clustering process of generating a cluster of relation vectors;

the at least one processor further carries out a feature vector clustering process of generating a cluster of feature vectors;

in the relation categorization process, the at least one processor carries out the relation vector categorization process by determining a cluster to which a relation vector generated in the relation vector generation process belongs, the cluster having been generated in the relation vector clustering process; and in the relation categorization process, the at least one processor carries out the feature vector categorization process by determining a cluster to which each of feature vectors generated in the feature vector generation process belongs, the cluster having been generated in the feature vector clustering process.

6. An information processing method, comprising:

generating a relation vector that represents a relation between a plurality of entities of interest from at least one relation vector generation sentence which has been selected from a sentence set and in which the plurality of entities of interest occur;

generating, for each of the plurality of entities of interest, a feature vector that represents a feature of that entity of interest from at least one feature vector generation sentence which has been selected from the sentence set and in which that entity of interest occurs; and categorizing a relation between the plurality of entities of interest with use of the relation vector and the feature vectors which have been respectively generated for the plurality of entities of interest, wherein:

in the feature vector generation process, generating, for each of the plurality of entities of interest, the feature vector from the at least one feature vector generation sentence with use of an algorithm that includes a plurality of parameters; and carrying out a feature vector generation parameter updating process of updating the plurality of parameters such that a degree of similarity increases between a feature vector that is generated in the feature vector generation process from a sentence in which an entity of interest occurs and a word vector that represents the entity of interest, and wherein:

in the feature vector generation process, carrying out, for each of the plurality of entities of interest and for each feature vector generation sentence, (1) a second word vector sequence generation process of generating a word vector sequence that corresponds to that feature vector generation sentence by replacing a word representing that entity of interest with a predetermined word vector and replacing a word representing an entity other than that entity of interest with a word vector representing the word, (2) a second Recurrent Neural Network (RNN) output vector sequence generation process of generating an Recurrent Neural Network (RNN) output vector sequence that corresponds to that feature vector generation sentence by inputting, into a recurrent neural network, the word vector sequence which has been generated in the second word vector sequence generation process, the recurrent neural network using a word vector sequence as input, and vectors corresponding to respective word vectors constituting that word vector sequence as output, (3) a sentence feature vector setting process of setting, from among vectors constituting the RNN output vector sequence generated in the second Recurrent Neural Network (RNN) output vector sequence generation process, a vector corresponding to that entity of interest to be a sentence feature vector that corresponds to that feature vector generation sentence, and (4) a feature vector calculation process of calculating the feature vector by averaging, for each element, sentence feature vectors which have been set in the sentence feature vector setting process and which correspond to respective feature vector generation sentences; and in the feature vector generation parameter updating process, updating a parameter of the recurrent neural network such that a degree of similarity increases between a sentence feature vector that is generated in the feature vector generation process from a sentence in which an entity of interest occurs and a word vector that represents the entity of interest.

7. A non-transitory storage medium storing a program for causing a computer to function as an information processing apparatus, the program causing the computer to carry out:

generating a relation vector that represents a relation between a plurality of entities of interest from at least one relation vector generation sentence which has been selected from a sentence set and in which the plurality of entities of interest occur;

generating, for each of the plurality of entities of interest, a feature vector that represents a feature of that entity of interest from at least one feature vector generation sentence which has been selected from the sentence set and in which that entity of interest occurs; and categorizing a relation between the plurality of entities of interest with use of the relation vector and the feature vectors which have been respectively generated for the plurality of entities of interest, wherein:

in the feature vector generation process, generating, for each of the plurality of entities of interest, the feature vector from the at least one feature vector generation sentence with use of an algorithm that includes a plurality of parameters; and carrying out a feature vector generation parameter updating process of updating the plurality of parameters such that a degree of similarity increases between a feature vector that is generated in the feature vector generation process from a sentence in which an entity of interest occurs and a word vector that represents the entity of interest, and wherein:

in the feature vector generation process, carrying out, for each of the plurality of entities of interest and for each feature vector generation sentence, (1) a second word vector sequence generation process of generating a word vector sequence that corresponds to that feature vector generation sentence by replacing a word representing that entity of interest with a predetermined word vector and replacing a word representing an entity other than that entity of interest with a word vector representing the word, (2) a second Recurrent Neural Network (RNN) output vector sequence generation process of generating an Recurrent Neural Network (RNN) output vector sequence that corresponds to that feature vector generation sentence by inputting, into a recurrent neural network, the word vector sequence which has been generated in the second word vector sequence generation process, the recurrent neural network using a word vector sequence as input, and vectors corresponding to respective word vectors constituting that word vector sequence as output, (3) a sentence feature vector setting process of setting, from among vectors constituting the RNN output vector sequence generated in the second Recurrent Neural Network RNN) output vector sequence generation process, a vector corresponding to that entity of interest to be a sentence feature vector that corresponds to that feature vector generation sentence, and (4) a feature vector calculation process of calculating the feature vector by averaging, for each element, sentence feature vectors which have been set in the sentence feature vector setting process and which correspond to respective feature vector generation sentences; and in the feature vector generation parameter updating process, updating a parameter of the recurrent neural network such that a degree of similarity increases between a sentence feature vector that is generated in the feature vector generation process from a sentence in which an entity of interest occurs and a word vector that represents the entity of interest.

8. An information processing apparatus, comprising at least one processor, the at least one processor carrying out:

a relation vector generation process of generating a relation vector with use of an algorithm including a plurality of parameters from at least one relation vector generation sentence which has been selected from a sentence set and in which a plurality of entities of interest occur, the relation vector representing a relation between the plurality of entities of interest;

a relation vector generation parameter updating process of updating the plurality of parameters such that a degree of similarity increases between a plurality of relation vectors that are generated in the relation vector generation process from a plurality of sentences in all of which the plurality of entities of interest occur; and a relation categorization process of categorizing a relation between the plurality of entities of interest with use of a relation vector which has been generated in the relation vector generation process, wherein:

in a feature vector generation process, the at least one processor generates, for each of the plurality of entities of interest, the feature vector from the at least one feature vector generation sentence with use of an algorithm that includes a plurality of parameters; and the at least one processor further carries out a feature vector generation parameter updating process of updating the plurality of parameters such that a degree of similarity increases between a feature vector that is generated in the feature vector generation process from a sentence in which an entity of interest occurs and a word vector that represents the entity of interest, and wherein:

in the feature vector generation process, the at least one processor carries out, for each of the plurality of entities of interest and for each feature vector generation sentence, (1) a second word vector sequence generation process of generating a word vector sequence that corresponds to that feature vector generation sentence by replacing a word representing that entity of interest with a predetermined word vector and replacing a word representing an entity other than that entity of interest with a word vector representing the word, (2) a second Recurrent Neural Network (RNN) output vector sequence generation process of generating an Recurrent Neural Network (RNN) output vector sequence that corresponds to that feature vector generation sentence by inputting, into a recurrent neural network, the word vector sequence which has been generated in the second word vector sequence generation process, the recurrent neural network using a word vector sequence as input, and vectors corresponding to respective word vectors constituting that word vector sequence as output, (3) a sentence feature vector setting process of setting, from among vectors constituting the RNN output vector sequence generated in the second Recurrent Neural Network (RNN) output vector sequence generation process, a vector corresponding to that entity of interest to be a sentence feature vector that corresponds to that feature vector generation sentence, and (4) a feature vector calculation process of calculating the feature vector by averaging, for each element, sentence feature vectors which have been set in the sentence feature vector setting process and which correspond to respective feature vector generation sentences; and in the feature vector generation parameter updating process, the at least one processor updates a parameter of the recurrent neural network such that a degree of similarity increases between a sentence feature vector that is generated in the feature vector generation process from a sentence in which an entity of interest occurs and a word vector that represents the entity of interest.

* * * * *